(12) United States Patent
Nagarajan et al.

(10) Patent No.: US 11,653,347 B2
(45) Date of Patent: May 16, 2023

(54) COEXISTENCE OF MULTIPLE UPLINK CONTROL CHANNEL FORMATS FOR WIRELESS COMMUNICATION WITH POWER SPECTRAL DENSITY LIMITATION

(71) Applicant: QUALCOMM Incorporated, San Diego, CA (US)

(72) Inventors: Anantha Krishna Karthik Nagarajan, San Diego, CA (US); Jing Sun, San Diego, CA (US); Xiaoxia Zhang, San Diego, CA (US); Tao Luo, San Diego, CA (US); Jun Ma, San Diego, CA (US); Wooseok Nam, San Diego, CA (US); Zhifei Fan, San Diego, CA (US); Qingjiang Tian, San Diego, CA (US); Hemant Saggar, Irvine, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 17/121,697

(22) Filed: Dec. 14, 2020

(65) Prior Publication Data
US 2022/0191869 A1 Jun. 16, 2022

(51) Int. Cl.
*H04W 72/04* (2023.01)
*H04W 72/044* (2023.01)
*H04W 74/00* (2009.01)
*H04W 72/02* (2009.01)
*H04W 74/08* (2009.01)

(52) U.S. Cl.
CPC ....... *H04W 72/0473* (2013.01); *H04W 72/02* (2013.01); *H04W 72/0413* (2013.01); *H04W 74/004* (2013.01); *H04W 74/0833* (2013.01)

(58) Field of Classification Search
CPC ........... H04W 72/0473; H04W 74/004; H04W 72/02; H04W 74/0833; H04W 72/0413
See application file for complete search history.

(56) References Cited

U.S. PATENT DOCUMENTS

| | | | |
|---|---|---|---|
| 2009/0257390 A1* | 10/2009 | Ji ........................ | H04W 72/082 370/329 |
| 2011/0235529 A1* | 9/2011 | Zetterberg .......... | H04L 27/2607 370/328 |
| 2016/0105884 A1* | 4/2016 | Li ..................... | H04W 74/0833 370/335 |

* cited by examiner

*Primary Examiner* — Brenda H Pham
(74) *Attorney, Agent, or Firm* — Arent Fox LLP /Qualcomm Incorporated

(57) ABSTRACT

Apparatus, methods, and computer-readable media for coexistence of multiple uplink control channel formats for wireless communication with power spectral density limitation are disclosed herein. A user equipment (UE) may communicate, with a base station (BS) over a random access channel on a first set of random access resources or a second set of random access resources, a random access request based on a comparison between an intended transmit power of the random access request and a reference transmit power threshold. The UE may communicate, on a first set of uplink resources, a control message for initial network access when the random access request is communicated on the first set of random access resources. The UE also may communicate, on a second set of uplink resources, the control message when the random access request is communicated on the second set of random access resources.

30 Claims, 16 Drawing Sheets

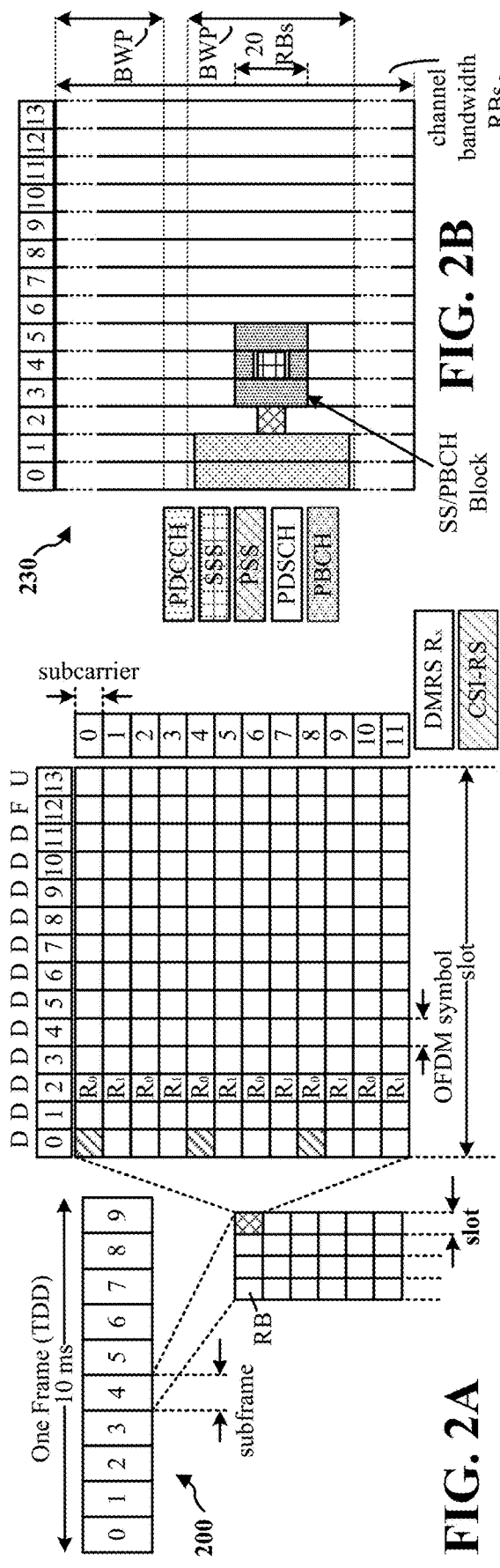
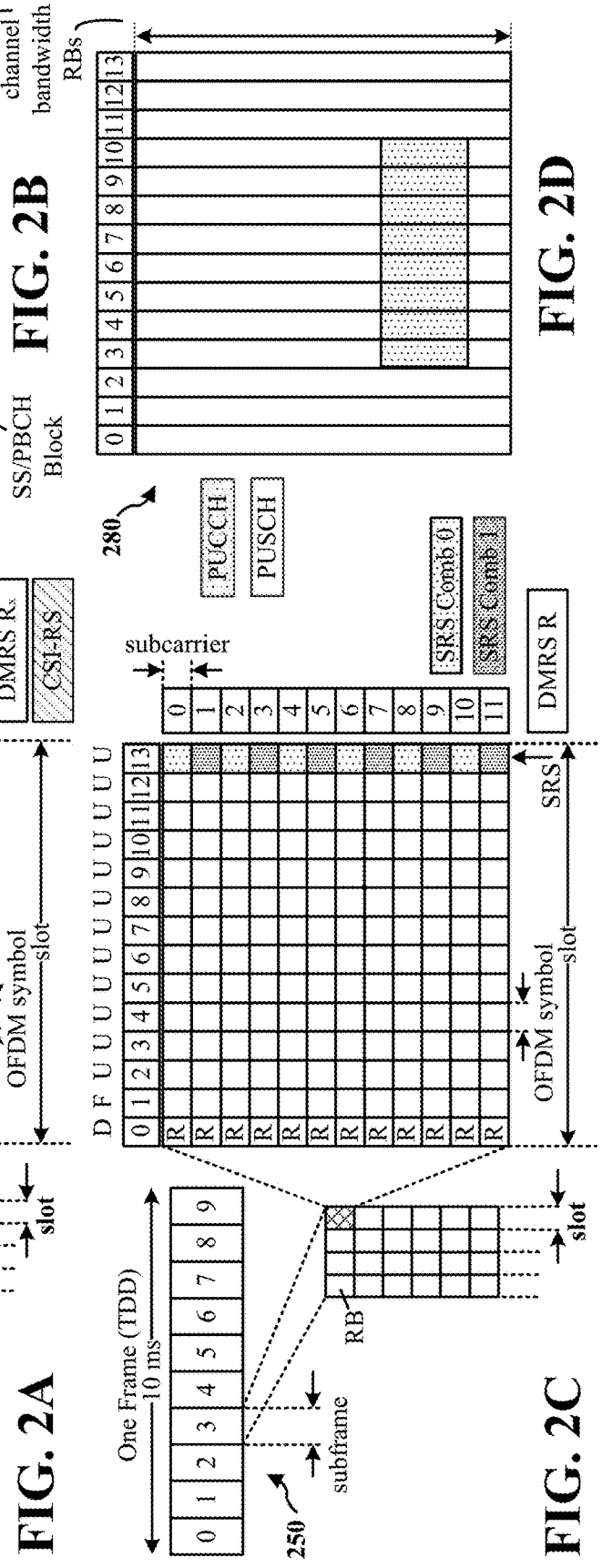
FIG. 2A  FIG. 2B  FIG. 2C  FIG. 2D

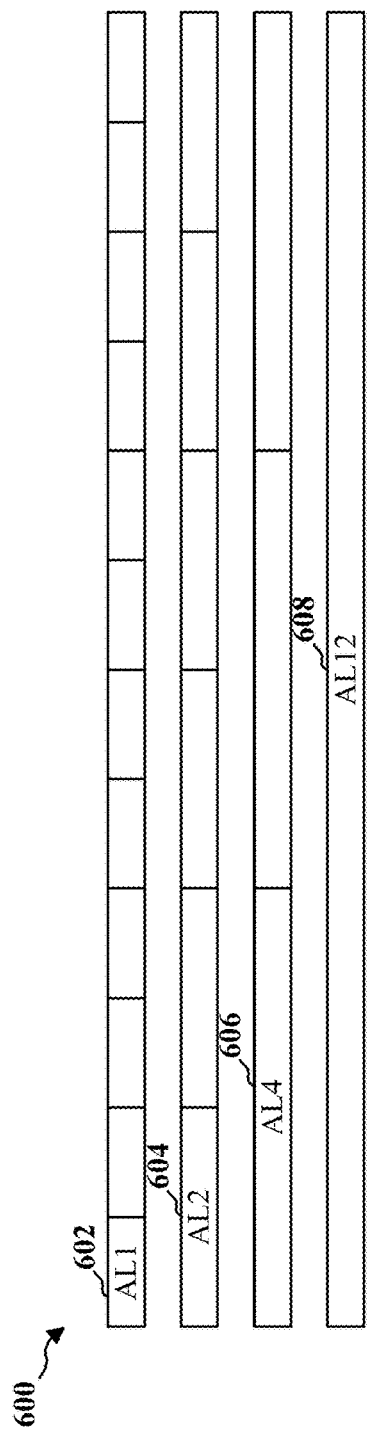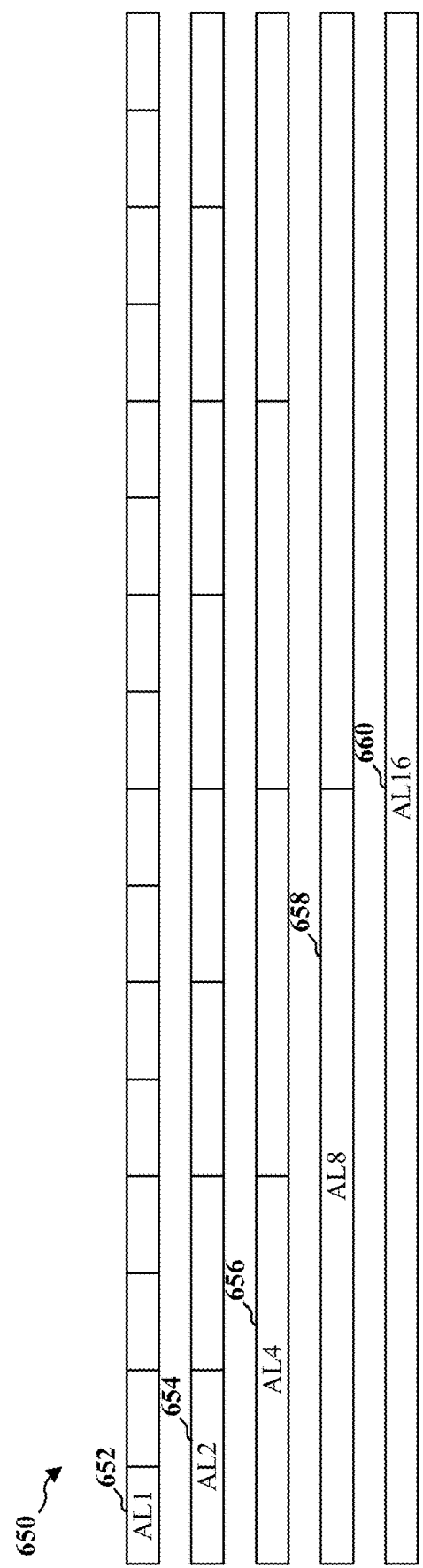

COEXISTENCE OF MULTIPLE UPLINK CONTROL CHANNEL FORMATS FOR WIRELESS COMMUNICATION WITH POWER SPECTRAL DENSITY LIMITATION

BACKGROUND

Technical Field

The present disclosure relates generally to wireless communication, and more particularly, to techniques for coexistence of multiple uplink control channel formats for wireless communication with power spectral density limitation.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For NR in a 60 GHz frequency band, the European Telecommunications Standard Institute (ETSI) regulation allows 23 decibel-milliwatts per megahertz (dBm/MHz) power spectral density (PSD) limitation and 40 dBm Effective Isotropic Radiated Power (EIRP) for c1 and c2 cases. In RAN1 at Frequency Range 2x (FR2x), the subcarrier spacing (SCS) may be set to 120 KHz as the numerology. Under a SCS of 120 KHz, a single resource block (RB) is 1.44 MHz, which may translate to about 24.58 dBm in transmit power. For a normal UE, the maximum EIRP is limited. In some aspects, the maximum EIRP the UE may support is 23 dBm. In this regard, a single RB transmission may already consume all allowable transmit power of the UE (e.g., 24.58 dBm). However, for a customer premises equipment (CPE) device, the maximum EIRP can be larger. In this case, if the allocated bandwidth is narrow, such as a single RB, the UE transmit power may be limited by PSD and may not transmit at a higher power, although the UE (e.g., as a CPE device) is capable of transmitting with more power (e.g., EIRP).

The subject technology provides for a scheme to select between a single RB and multiple RBs with a corresponding cyclic shift step size to improve physical uplink control channel (PUCCH) multiplexing capacity when using contiguous frequencies. For example, the subject technology provides for having different physical random access channel (PRACH) resources for UEs requesting either a multi-RB PUCCH or a single RB PUCCH. In some aspects, the base station can configure two sets of default PUCCH resources. For example, the base station may configure separate PRACH resources for multiple UEs using different PUCCH resources, and the base station may configure a switching point in terms of transmission power for a UE to select between a PRACH resource corresponding to a single RB PUCCH and a PRACH resource corresponding to a multi-RB PUCCH. In some aspects, the separate PRACHs can be separate sets of preamble sequences in the same random access channel (RACH) occasion (RO). In other aspects, the separate PRACHs can be in separate RO configurations. The Legacy low-power UE may not need to understand the separate PRACH resource configuration or the multi-RB PUCCH allocation. Additionally, the separate PRACHs may include different PRACH formats for the different PUCCH types. A CPE UE may integrate its preamble resource selection in the power ramping process. For example, when the CPE UE determines that its intended PRACH transmit power is lower than a transmit power threshold, the CPE UE may select a PRACH resource that corresponds to the single RB PUCCH. Alternatively, when the CPE UE determines that its intended PRACH transmit power exceeds the transmit power threshold, the CPE UE may select a PRACH resource that corresponds to the multi-RB PUCCH. Depending in which PRACH resource set the PRACH is detected, the base station can determine which set of PUCCH resources the UE may use for the base station to monitor for the PUCCH.

The present disclosure also provides for introducing multiple RB levels for different PUCCH formats such as PUCCH format 0 and PUCCH format 1 for enhancing UE multiplexing capability. The subject technology provides for a nested structure having multiple aggregation levels, where each aggregation level corresponds to a different RB size. For example, a first nested structure of aggregation levels may include {1RB, 2RB, 4RB, 12 RB} or a second nested structure of aggregation levels may include {1 RB, 2RB, 4RB, 8RB, 16RB}. Depending on a selected aggregation level, a UE may use a corresponding RB size X for its PUCCH that starts from a RB starting index that corresponds to RB index k*X. Because cyclic shift step sizes are co-prime to the (nominal) PUCCH size, it may be desirable to provide for a cyclic step size that is adaptable to the intermediate RB level (RB size). In some implementations, a common cyclic shift step size (e.g., 5) can be used for all nominal PUCCH sizes, where the nominal PUCCH sizes are defined in a limited set of PUCCH sizes (e.g., 1/2/4/12 or 1/2/4/8/16). In other implementations, the cyclic shift step size may be defined per nominal PUCCH size, where the cyclic shift step size is co-prime with the nominal PUCCH size.

In an aspect of the disclosure, a method, a computer-readable medium, and an apparatus are provided. The apparatus may be a UE. The apparatus is configured to communicate, with a base station (BS) over a random access channel on a first set of random access resources or a second set of random access resources, a random access request based on a comparison between an intended transmit power of the random access request and a reference transmit power threshold. The apparatus is also configured to communicate, with the BS over an uplink channel on a first set of uplink resources corresponding to the first set of random access resources, a control message for initial network access when the random access request is communicated on the first set of random access resources. The apparatus is also configured to communicate, with the BS over the uplink channel on a second set of uplink resources corresponding to the second set of random access resources, the control message when the random access request is communicated on the second set of random access resources.

In an aspect of the disclosure, a method, a computer-readable medium, and an apparatus are provided. The apparatus may be a base station. The apparatus is configured to receive, from a user equipment (UE) over a random access channel, a random access request. The apparatus is also configured to determine whether the random access request is received on one or more resources within a first random access resource allocation or a second random access resource allocation. The apparatus is also configured to monitor for an uplink control message within a resource block of a first uplink resource allocation when the random access request is received on the one or more resources within the first random access resource allocation. The apparatus is also configured to monitor for the uplink control message across a plurality of contiguous resource blocks of a second uplink resource allocation when the random access request is received on the one or more resources within the second random access resource allocation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 6A and 6B illustrate examples of aggregation level-based resource block structures, in accordance with some aspects of the present disclosure.

DETAILED DESCRIPTION

Figure 1:
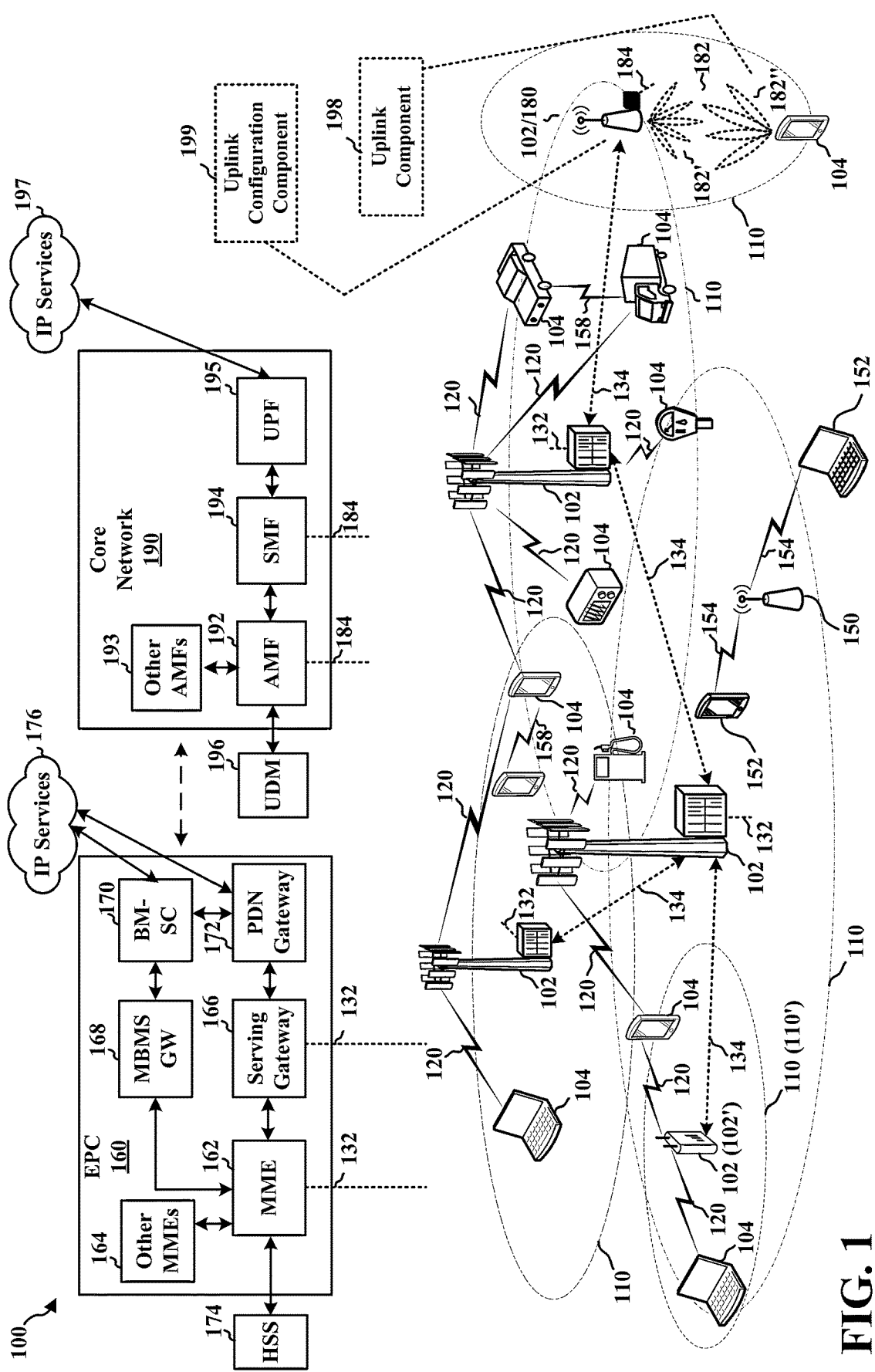
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE). In a wireless network, a base station (BS) may serve one or more UEs. Each UE may transmit uplink (UL) control information to a serving BS to facilitate scheduling at the BS. UL refers to the transmission direction from a UE to a BS. UL control channel information may include scheduling requests (SRs), channel status information, and message acknowledgements. Channel status information may include channel quality information (CQI), channel state information (CSI), pre-coding matrix indicators (PMIs), and/or rank indicators (RIs). Message acknowledgements may include hybrid automatic repeat request (HARQ) acknowledgements/not-acknowledgments (ACKs/NAKs).

To meet the growing demands for expanded mobile broadband connectivity, wireless communication technologies are advancing from the Long-Term Evolution (LTE) technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

In the context of NR, UL control information may be carried in a physical uplink control channel (PUCCH). NR may define various PUCCH formats for carrying UL control information of different types and/or different sizes and may support multiplexing for some PUCCH formats. For example, NR may include a PUCCH format 0 and a PUCCH format 1, among others. In some instances, a PUCCH signal may carry uplink control information (UCI) and a demodulation reference signal (DMRS), which may facilitate channel estimation and UCI decoding at the BS.

In NR, a short PUCCH format 0 may span a duration of about one orthogonal frequency-division multiple (OFDM) symbol or about two OFDM symbols and may carry two or less uplink control information (UCI) bits. A long PUCCH format 1 may have a duration between about four OFDM symbols and about fourteen OFDM symbols and may carry two or less UCI bits. NR may support multiplexing of different UEs on the same frequency resources for some of the PUCCH formats (e.g., formats 0 and 1).

Some spectrums may have certain PSD limitations. For example, the ETSI document EN 301 893 V2.1.1 specifies various PSD limits for sub-6 GHz frequency bands and the ETSI draft document EN 302 567 V2.0.22 specifies a maximum equivalent isotropic radiated power (EIRP) and an EIRP density for 60 GHz frequency bands. Some other frequency bands, such as citizens broadband radio service (CBRS) bands at about 3.5 GHz, may not restrict transmissions to a particular PSD limit. In general, different spectrums may have different PSD limitations and/or different bandwidth occupancy requirements.

In the 60 GHz frequency band, the ETSI regulation allows 23 dBm/MHz PSD limitation and 40 dBm EIRP for c1 and c2 cases. In RAN1 at FR2x, the subcarrier spacing (SCS) may be set to 120 KHz as the numerology. Under a SCS of 120 KHz, a single resource block (RB) is 1.44 MHz, which may translate to about 24.58 dBm in transmit power. For a normal UE, the maximum EIRP is limited. In some aspects, the maximum EIRP the UE may support is 23 dBm. In this regard, a single RB transmission may already consume all allowable transmit power of the UE (e.g., 24.58 dBm). However, for a customer premises equipment (CPE) device, the maximum EIRP can be larger. In this case, if the allocated bandwidth is narrow, such as a single RB, the UE transmit power may be limited by PSD and may not transmit at a higher power, although the UE (e.g., as a CPE device) is capable of transmitting with more power (e.g., EIRP).

As described above, some frequency spectrums may have certain PSD limitations. To meet the PSD limitation, a UE may only be able to transmit up to a certain maximum power depending on the signal bandwidth. One approach to meeting the PSD limitation of a frequency spectrum and allowing a wireless communication device to transmit in the frequency spectrum at a full transmit power is to spread the frequency occupancy of a transmission signal over a wider bandwidth. However, the spreading of the frequency occupancy reduces the number of wireless communication devices that can be frequency-multiplexed in the frequency spectrum.

The present application describes mechanisms for scheduling and/or multiplexing uplink control channel signals from multiple UEs in a shared spectrum including a PSD limitation. For a connected mode UE, the UE capability may be known to a base station (e.g., gNB). In this respect, the base station can schedule the UE with a wider uplink bandwidth and lower modulation and coding scheme (MCS) to collect more power. However, this scheme may not be available at initial access for PUCCH formats 0/1, which may occupy a single RB. In NR-U, to solve the link budget issue for PUCCH formats 0/1, one approach includes an interlaced version of the PUCCH formats 0/1, where one interlace with a bandwidth of 20 MHz (e.g., 10 or 11 RBs) is used for one PUCCH format 0/1 transmission. In an alternative approach, the NR-U design for interlaced PUCCH transmissions may be extended for millimeter-wavelength (mmW) band with PSD limitation, such that multiple continuous RBs are used for transmitting a PUCCH signal instead of using interlaced RB allocations. However, for initial network access, the UE may find it challenging to determine the proper PUCCH format (e.g., from a default PUCCH table) when both low power UEs (e.g., not capable of high transmit power) and CPE UEs (e.g., capable of high transmit power) are present. In some aspects, low-power UEs may not use a wideband PUCCH format (e.g., 10 or 11 RBs), whereas a CPE UE may not need to use a wideband PUCCH format if the CPE UE is in the cell center.

The disclosed aspects employ a scheme for selecting between a single RB and multiple RBs with a corresponding cyclic shift step size to improve PUCCH multiplexing capacity when using contiguous frequencies. For example, the subject technology provides for having different PRACH resources for UEs requesting either a multi-RB PUCCH or a single RB PUCCH. In some aspects, the base station can configure two sets of default PUCCH resources. For example, a first set may correspond to a Legacy single RB PUCCH and a second set may correspond to a multi-RB PUCCH. In some aspects, a Legacy UE (e.g., a low-power UE) may not need to understand or support a multi-RB PUCCH allocation since the Legacy UE has its transmit power limited by PSD and may not transmit across more than one RB size.

The base station may configure separate PRACH resources for multiple UEs using different PUCCH resources, and the base station may configure a switching point in terms of transmission power for a UE to select between a PRACH resource corresponding to a single RB PUCCH and a PRACH resource corresponding to a multi-RB PUCCH. In some aspects, the separate PRACHs can be separate sets of preamble sequences in the same RACH occasion (RO). In other aspects, the separate PRACHs can be in separate RO configurations. The Legacy low-power UE may not need to understand the separate PRACH resource configuration or the multi-RB PUCCH allocation. Additionally, the separate PRACHs may include different PRACH formats for the different PUCCH types. A CPE UE may integrate its preamble resource selection in the power ramping process. For example, when the CPE UE determines that its intended PRACH transmit power is lower than a transmit power threshold, the CPE UE may select a PRACH resource that corresponds to the single RB PUCCH. Alternatively, when the CPE UE determines that its intended PRACH transmit power exceeds the transmit power threshold, the CPE UE may select a PRACH resource that corresponds to the multi-RB PUCCH. Depending in which PRACH resource set the PRACH is detected, the base station can determine which set of PUCCH resources the UE may use for the base station to monitor for the PUCCH.

In NR, it may be desirable to provide intermediate levels other than 1 RB and 10/11 RBs to further enhance UE frequency multiplexing. For a higher power capable UE such as a CPE UE, if the transmit power exceeds the transmit power threshold, the CPE UE can switch from the 1 RB mode to the 10/11 RB mode, even though for each RB, the transmit power may be less than 24.58 dBm. On the other hand, introducing multiple RB levels for PUCCH can facilitate allowing additional UEs to perform frequency-division multiplexing (FDM), or one UE's PUCCH can FDM with another UE's data, for enhancing UE multiplexing capability. The introduction of intermediate RB levels (other than 10/11 RBs) may be beneficial to beamforming techniques in a mmW channel. For example, from a signal-to-noise (SNR) standpoint, focusing power in a narrower band using intermediate RB levels (other than 10/11 RBs) may be beneficial.

The present disclosure provides for introducing multiple RB levels for different PUCCH formats such as PUCCH format 0 and PUCCH format 1. The subject technology provides for a nested structure having multiple aggregation levels, where each aggregation level corresponds to a different RB size. For example, a first nested structure of aggregation levels may include {1RB, 2RB, 4RB, 12 RB} or a second nested structure of aggregation levels may include {1 RB, 2RB, 4RB, 8RB, 16RB}. Depending on a selected aggregation level, a UE may use a corresponding RB size X for its PUCCH that starts from a RB starting index that corresponds to RB index k*X.

Moreover, in a NR-U PUCCH interlace, the cyclic shift ramping may be fixed to a ramping step size 5 (modulo 12), where 5 is selected as it is co-prime with 12. The cyclic shift step size may be selected from a set of cyclic shift step sizes {1, 5, 7, 11}. Cyclic shift ramping may be applied across RBs within one PUCCH. In this regard, the cyclic shifting can be applied across 10 or 11 RBs in the PUCCH interlace. Although the design can support up to 12 RBs in an interlace, the number of RBs in an interlace is PSD limited to 10 or 11 RBs. Because cyclic shift step sizes are co-prime to the (nominal) PUCCH size, it may be desirable to provide for a cyclic step size that is adaptable to the intermediate RB level (RB size). In some implementations, a common cyclic shift step size (e.g., 5) can be used for all nominal PUCCH sizes, where the nominal PUCCH sizes are defined in a limited set of PUCCH sizes (e.g., 1/2/4/12 or 1/2/4/8/16). In other implementations, the cyclic shift step size may be defined per nominal PUCCH size, where the cyclic shift step size is co-prime with the nominal PUCCH size.

As discussed above, the disclosed implementations may include frequency multiplexing with cyclic-shift separation to multiplex PUCCH transmissions from different UEs on the same time-frequency resources (e.g., within a set of contiguous frequencies). For example, the cyclic shift step size may be selected based on the PUCCH RB size.

Aspects of the present application can provide several benefits. For example, NR may support multiplexing for PUCCH formats 0/1 using single or multi-RB resource allocations. The use of frequency multiplexing with cyclic-shift separation that corresponds to a nominal multi-RB PUCCH size for PUCCH formats 0/1 can further increase UE multiplexing capacity.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In various aspects, the access network 100 may operate over various frequency bands, for example, in frequency ranges between about 2 GHz to above 60 GHz. Different frequency bands may have different PSD requirements. As described above, the ETSI document EN 301 893 V2.1.1 specifies PSD requirements for various sub-6 GHz bands. For example, the frequency band between about 5150 MHz and about 5350 MHz may have a maximum allowable PSD level of about 10 dBm/MHz with transmit power control (TPC). The frequency band between about 5250 MHz and about 5350 MHz may have a maximum allowable PSD level of about 7 dBm/MHz without TPC. The frequency band between about 5150 MHz and about 5250 MHz may have a maximum allowable PSD level of about 10 dBm/MHz without TPC. The frequency band between about 5470 MHz and about 5725 MHz may have a maximum allowable PSD level of about 17 dBm/MHz with TPC and a maximum allowable PSD level of about 14 dBm/MHz without TPC. The ETSI draft document EN 302 567 V2.0.22 specifies a maximum EIRP and an EIRP density for 60 GHz bands. For example, a 60 GHz band may allow an EIRP density of about 13 dBm/MHz and an EIRP of about 40 dBm. In the 60 GHz frequency band, the ETSI regulation allows 23 dBm/MHz PSD limitation.

To satisfy a certain PSD limitation in a frequency spectrum, a transmitter (e.g., the BSs 102 and the UEs 104) may distribute the frequency occupancy of a transmission signal over a wider bandwidth. For example, a transmitter may transmit a signal over multiple narrow contiguous frequencies in a frequency bandwidth. The distribution of the frequency occupancy may be in various granularities and forms, such as a single resource block or multiple resource blocks, as described in greater detail herein. In one or more implementations, the BSs 102 (and/or 180) and the UEs 104 may communicate over the various frequency bands by selecting between a single resource block waveform and a multi-resource block waveform depending on the PSD requirements in the frequency spectrums and/or the power utilization factors of the UEs 104. Mechanisms for selecting between the single resource block waveform and the multi-resource block waveform are described in greater detail herein.

Referring again to FIG. 1, in certain aspects, the UE 104 may include an uplink component 198 that is configured to communicate, with a BS over a random access channel on a first set of random access resources or a second set of random access resources, a random access request based on a comparison between an intended transmit power of the random access request and a reference transmit power threshold. The uplink component 198 is also configured to communicate, with the BS over an uplink channel on a first set of uplink resources corresponding to the first set of random access resources, a control message for initial network access when the random access request is communicated on the first set of random access resources. The uplink component 198 is also configured to communicate, with the BS over the uplink channel on a second set of uplink resources corresponding to the second set of random access resources, the control message when the random access request is communicated on the second set of random access resources.

Referring still to FIG. 1, in certain aspects, the base station 102/180 may include an uplink configuration component 199 that is configured to receive, from a UE over a random access channel, a random access request. The uplink configuration component 199 is also configured to determine whether the random access request is received on one or more resources within a first random access resource allocation or a second random access resource allocation. The uplink configuration component 199 is also configured to monitor for an uplink control message within a resource block of a first uplink resource allocation when the random access request is received on the one or more resources within the first random access resource allocation. The uplink configuration component 199 is also configured to monitor for the uplink control message across a plurality of contiguous resource blocks of a second uplink resource allocation when the random access request is received on the one or more resources within the second random access resource allocation.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

In uplink repetitions, two PUCCH sequences may overlap with one another over at least one slot (e.g., in a slot-based procedure). A UE may be configured to transmit PUCCH in a set of symbols, and the UE may detect a dynamic grant (e.g., DCI 2_0) indicating a subset of the set of symbols as a downlink data transmission or other flexible downlink signaling. In other examples, the UE may detect other types of DCI (e.g., DCI 1_0/1_1/0_1) indicating CSI-RS or PDSCH in a subset of the set of symbols. In some approaches of facilitating uplink repetitions, after some processing time (e.g., about two symbols from end of DCI) to decode the DCI associated with the PDSCH, for example, the UE may cancel (or drop) the PUCCH from the subset of symbols. In some examples, in the case of a PUCCH repetition, the UE may only cancel the PUCCH repetition overlapped with a DG PDSCH. In some aspects, the UE may avoid SPS HARQ-ACK dropping for TDD due to a potential PUCCH collision with at least one downlink symbol or flexible symbol. In some aspects, a dropped SPS ACK/NACK signal due to a dynamic SFI or dynamic grant (DG), a semi-static TDD can be retransmitted by the UE. As described above, when an SPS-based uplink repetition carrying HARQ-ACK information overlaps with a DG PDSCH, the uplink repetition is dropped. However, this approach in handling overlapped uplink repetitions with SPS HARQ-ACK information requires additional resources to retransmit downlink data when a dropped uplink repetition carries SPS HARQ-ACK information.

The subject technology provides for selecting between a single RB and multiple RBs with a corresponding cyclic shift step size to improve PUCCH multiplexing capacity when using contiguous frequencies. For example, the subject technology provides for having different PRACH resources for UEs requesting either a multi-RB PUCCH or a single RB PUCCH. In this regard, the subject technology increases UE frequency multiplexing capacity for PUCCH formats 0/1 by supporting use of single or multi-RB resource allocations. The use of frequency multiplexing with cyclic-shift separation that corresponds to a nominal multi-RB PUCCH size for PUCCH formats 0/1 can further increase UE frequency multiplexing capacity.

Figure 3:
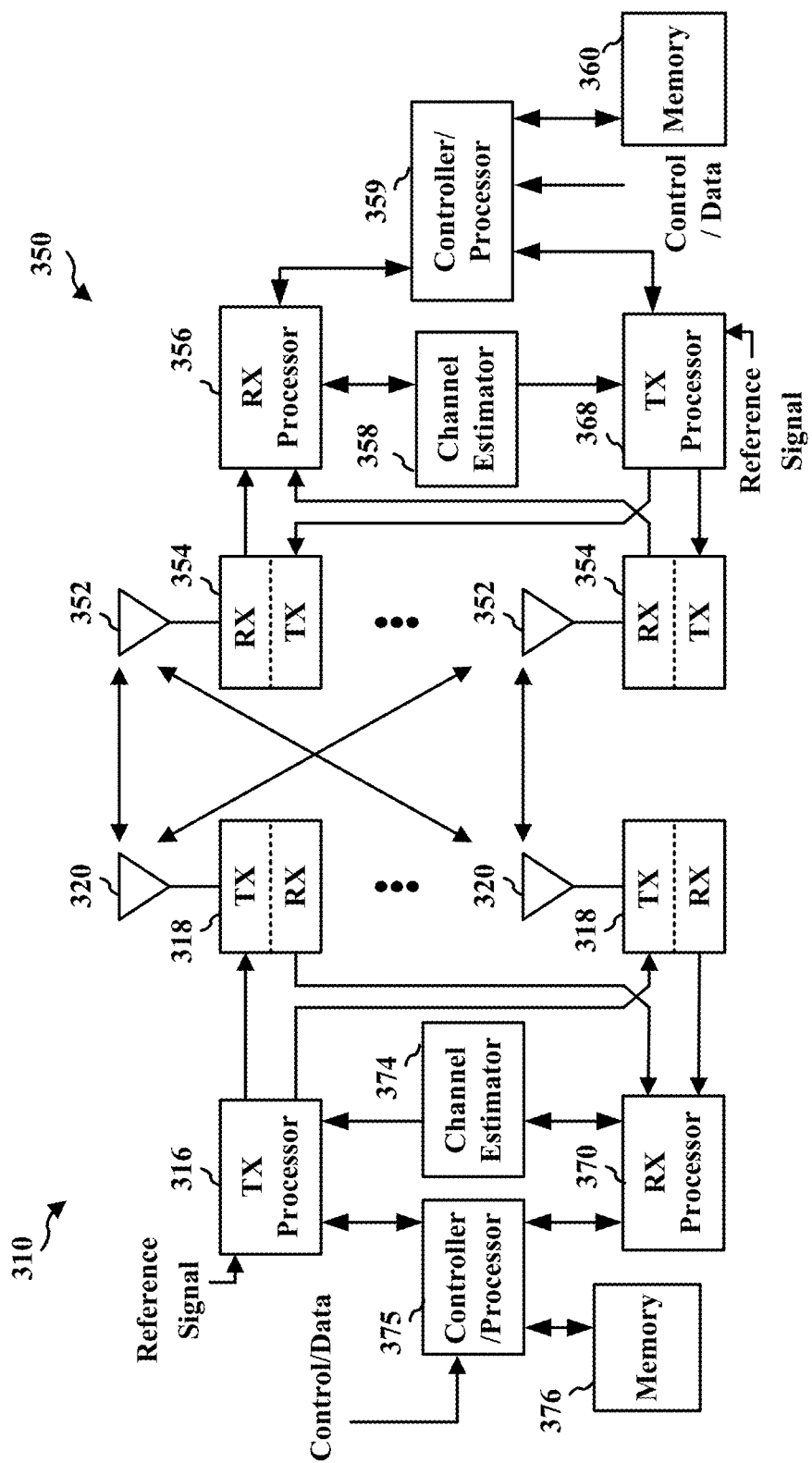
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with, for example, communicatively coupled with, a memory 360 that stores program code(s), for example, processor-readable code(s), and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with, for example, communicatively coupled with, a memory 376 that stores program code(s), for example, processor-readable code(s), and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. Furthermore, one or more of TX processor 368, the RX processor 356, and the controller/processor 359 may include at least one processor configured to perform the functionality illustrated in the flowchart with reference to FIG. 11, where the at least one processor controls or instructs one or more components illustrated in UE 350 to perform various functions.

At least one of the TX processor 316, the RX processor 370, and the controller/processor 375 may be configured to perform aspects in connection with 199 of FIG. 1. Furthermore, one or more of TX processor 316, the RX processor 370, and the controller/processor 375 may include at least one processor configured to perform the functionality illustrated in the flowchart with reference to FIG. 12, where the at least one processor controls or instructs one or more components illustrated in BS 310 to perform various functions.

Figure 4:
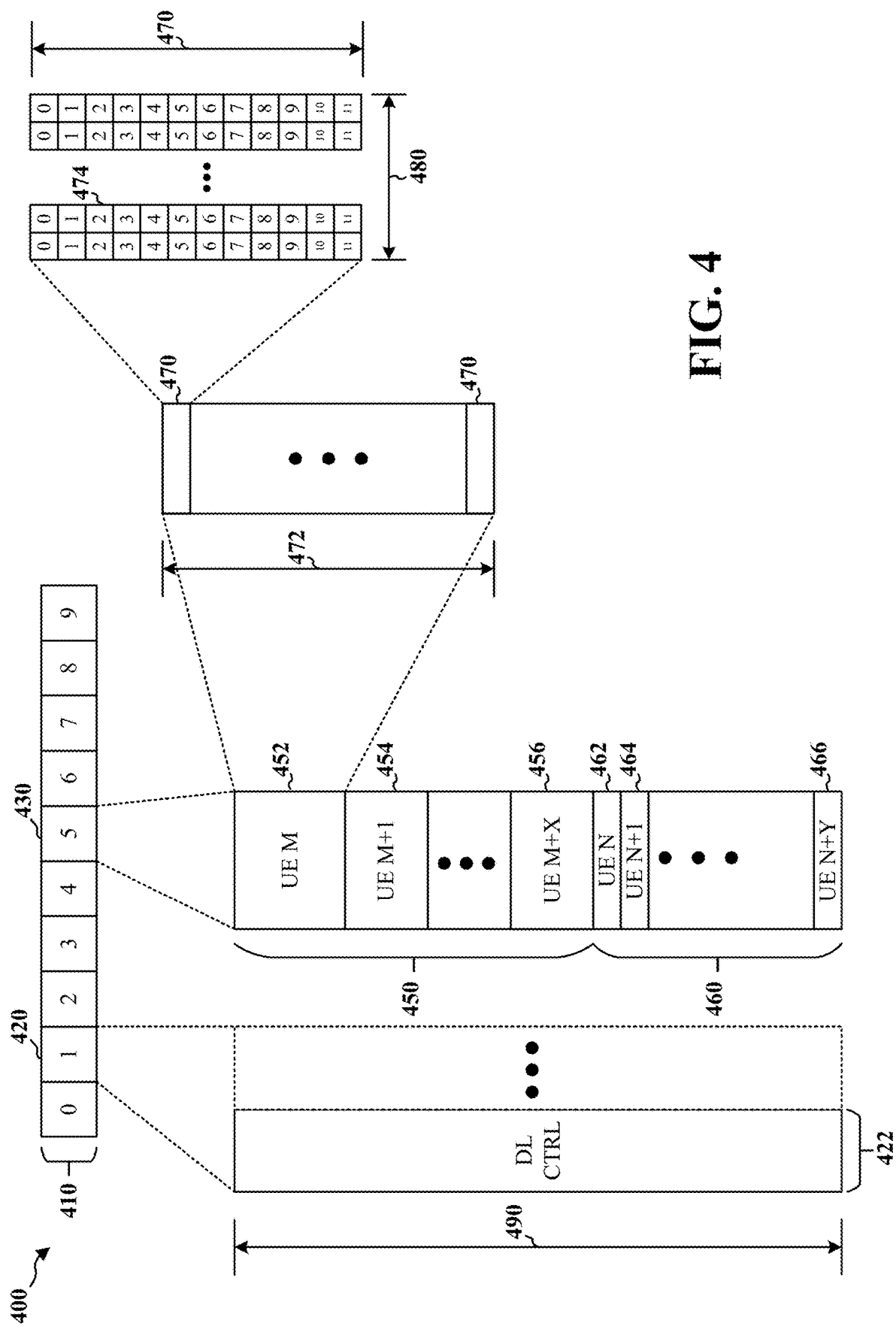
FIG. 4 illustrates an example of a resource configuration for coexistence of single resource block and multi-resource block uplink transmissions, in accordance with some aspects of the present disclosure.

FIG. 4 illustrates an example of a resource configuration 400 for coexistence of single resource block and multi-resource block uplink transmissions. Resource configuration 400 may be used for communication over a shared radio frequency spectrum band between multiple UEs 104 and base stations 102 via a carrier 410, which may be examples of the corresponding devices described with reference to FIGS. 1 and 3.

System resources of carrier 410 may be divided in time, e.g., into a plurality of transmission time intervals (TTIs). In some aspects, resources associated with a single TTI may be allocated either for uplink or downlink information (e.g., TTIs may be time division duplexed). As an example, base station 102 may allocate TTI 420 as a downlink TTI for the carrier, while TTI 430 may be allocated for uplink transmissions.

Carrier 410 may be associated with a frequency spectrum 490 (e.g., 50 MHz, 100 MHz, 200 MHz, 400 MHz), and may have a common synchronization signal (e.g., primary synchronization signal (PSS), secondary synchronization signal (SSS), etc.) and broadcast channels (e.g., including system information such as a master information block (MIB), system information blocks (SIBs), etc.) that carry common system information for the carrier 410. TTI 420 may contain a control channel 415, which may include uplink resource allocations for TTI 430. Control channel 422 may occupy a portion of the time-frequency resources of TTI 420 (e.g., spanning the frequency spectrum 490 for a portion of the time resources of TTI 420, etc.). The remaining time-frequency resources of TTI 420 may be allocated for transmission of downlink data.

TTI 430 may additionally be associated with frequency spectrum 490. In some cases, a base station 102 may divide frequency spectrum 490 into a first contiguous waveform bandwidth region 450 and a second contiguous waveform bandwidth region 460. In some aspects, the first contiguous waveform bandwidth region 450 and the second contiguous waveform bandwidth region 460 may span respective fractions of the frequency spectrum 490. In aspects of the present disclosure, the narrowest frequency division for a waveform type associated with a time duration (e.g., TTI 420, TTI 430) may be a resource unit or a subcarrier. As an example, each of the regions in the first contiguous waveform bandwidth region 450 (e.g., 452, 452, 456) may be a grouping of multiple RBs. In another example, each of the regions in the second contiguous waveform bandwidth region 460 (e.g., 462, 462, 466) may be a single resource block having multiple resource units or subcarriers. In some aspects, a UE communicating over frequency spectrum 490 may be allocated (e.g., via control channel 422 information) a single resource block associated with the second contiguous waveform bandwidth region 460. In other aspects, the UE communicating over the frequency spectrum 490 may be allocated (e.g., via control channel 422 information) a multi- RB associated with the first contiguous waveform bandwidth region 450. Different regions may also have different contiguous frequency parameters (e.g., bandwidth, subcarrier based frequency hopping, resource unit based frequency hopping, number of subcarriers or resource units in each contiguous section of an allocation, number of subcarriers or resource units between contiguous sections, etc.). In some aspects, each of the regions in either of the first contiguous waveform bandwidth region 450 or the second contiguous waveform bandwidth region 460 may use different cyclic shift ramping parameters (e.g., cyclic shift step size).

In some aspects, the first contiguous waveform bandwidth region 450 may be reserved for contiguous waveform transmission and wider band transmissions (compared to narrow band transmissions in the second contiguous waveform bandwidth region 460). Multiple resource blocks may be assigned to a given UE (e.g., via control channel 422 information). These resource blocks may be located next to each other in frequency (e.g., they may be contiguous). In the present example, each of the RB regions (e.g., 452, 454, 456) in first contiguous waveform bandwidth region 450 may include multiple resource blocks. In aspects of the present disclosure, during an uplink TTI 430, a UE may transmit over one of the first contiguous waveform bandwidth region 450, the second contiguous waveform bandwidth region 460, or a narrowband communication bandwidth region (not shown).

In some aspects, the TTI 430 may include a control bandwidth region and a shared bandwidth region of the carrier 410. For example, control bandwidth region may be used for control channel transmissions (e.g., non-data associated uplink channels) such as PUCCH transmissions or PRACH transmissions. The shared bandwidth region may be used for data transmissions, or other transmissions, and may be allocated or divided into bandwidth portions associated with interlaced and contiguous uplink transmissions. Additionally, sounding reference signal (SRS) transmissions may be mapped to contiguous resource blocks of the carrier 410. For example, UEs 104 configured for operation using contiguous frequency uplink data or control transmissions may also use contiguous SRS resource blocks. In some cases, SRS may be dynamically triggered, in which case the trigger may include dynamic indication of a waveform type for the SRS.

In the present example, the control bandwidth region includes the resource block regions 452, 454, 456, 462, 464, 466. These regions within the control bandwidth region may be used for transmission of control transmissions such as PUCCH, PRACH, SRS, etc. UEs configured for operation over the carrier 410 may support contiguous frequency transmission over respective regions in the control bandwidth region 425, and may be semi-statically configured for contiguous frequency transmission. Each uplink channel (e.g., PUCCH, PRACH, etc.) or uplink channel information (UCI) format may be configured with an operating bandwidth, a waveform type, or the like. In the example illustration of FIG. 4, each of RB regions 452, 454, 456, 462, 464, 466 may represent control transmissions associated with different UEs 104. As illustrated in FIG. 4, each of the resource block regions 452, 454, 456 includes multiple resource blocks 470, and each of the RB regions 462, 464, 466 includes a single resource block 470. Additionally, resource blocks 470 may be further defined in terms of time. For example, a contiguous pattern of resource blocks 470 may be defined for a time duration 480. In some cases, time duration 440 may refer to one or more TTIs for which the resource blocks 470 are allocated to different UEs. In some examples different configurations for the resource blocks 470 may be provided for different time durations 480 (e.g., different subframes may be configured according to different contiguous frequency parameters for a bandwidth region). Other time durations may have similar or different allocation or ordering of resource blocks 470.

The resource configuration 400 may be employed by BSs such as the BSs 102/180 and 310 and UEs such as the UEs 104 and 350 to communicate over the frequency spectrum 490. The frequency spectrum 490 may have channel bandwidth of about 20 megahertz (MHz) or about 100 MHz and a SCS of about 30 kHz or about 120 kHz. The frequency spectrum 490 may be located at any suitable frequencies. In some implementations, the frequency spectrum 490 may be at about 3.5 GHz, 6 GHz, or 60 GHz. The resource configuration 400 allocates resources at a resource block (RB)-granularity level.

In the second contiguous waveform bandwidth region 460, each region includes one RB 470 that spans a subband 472 of the frequency spectrum 490. Thus, the regions 462, 464, 466 have a granularity at an RB level. The RBs 470 are indexed from 0 to 11. Each RB 470 may span about twelve subcarriers 474 in frequency and a time period 480. The time period 480 may span any suitable number of OFDM symbols. In some implementations, the time period 480 may include one or more TTIs, where each TTI may include about fourteen OFDM symbols.

The use of either a single RB or multi-RBs having contiguous frequencies for an allocation in the frequency spectrum 490 allows a transmitter to transmit at a higher power level than when an allocation occupies interlaced frequencies. As an example, the frequency spectrum 490, under a SCS of 120 KHz, may have a single RB span 1.44 MHz that may translate to about 24.58 dBm in transmit power while providing a maximum allowable PSD level of about 23 dBm/MHz such that a transmitter (e.g., the UEs 104 and 350) may have a power amplifier (PA) capable of transmitting up to about 23 dBm. Distributing frequency occupancy of an allocation with multiple RBs may allow the transmitter to transmit at full power of about 23 dBm while maintaining a PSD level of lesser than 23 dBm/MHz. Thus, the use of single RB and/or multi-RBs with contiguous frequencies for resource allocation can provide better power utilization and enhance UE frequency multiplexing.

In an aspect, the resource configuration 400 may be applied to a PUCCH, a PUSCH, and a PRACH to provide a power boost at a transmitter. For example, a UE may transmit a random access preamble to a BS 102 during an initial network access over a PRACH channel using RACH resources that correspond to one of the RB regions 462, 464, 466 or RB regions 452, 454, 456, transmit UL control information to a BS over a PUCCH channel using one of the RB regions 452, 454, 456, 462, 464, 466, and/or transmit UL data over a PUSCH using one of the regions in either the first contiguous waveform bandwidth region 450 and the second contiguous waveform bandwidth region 460. In one or more implementations, the resource configuration 400 may be applied to spectrum sharing, where a UE 104 or a BS 102/180 may transmit a medium reservation signal using a single-RB frequency structure or a multi-RB frequency structure, for example, RB region 452, to improve medium sensing performance.

Figure 5:
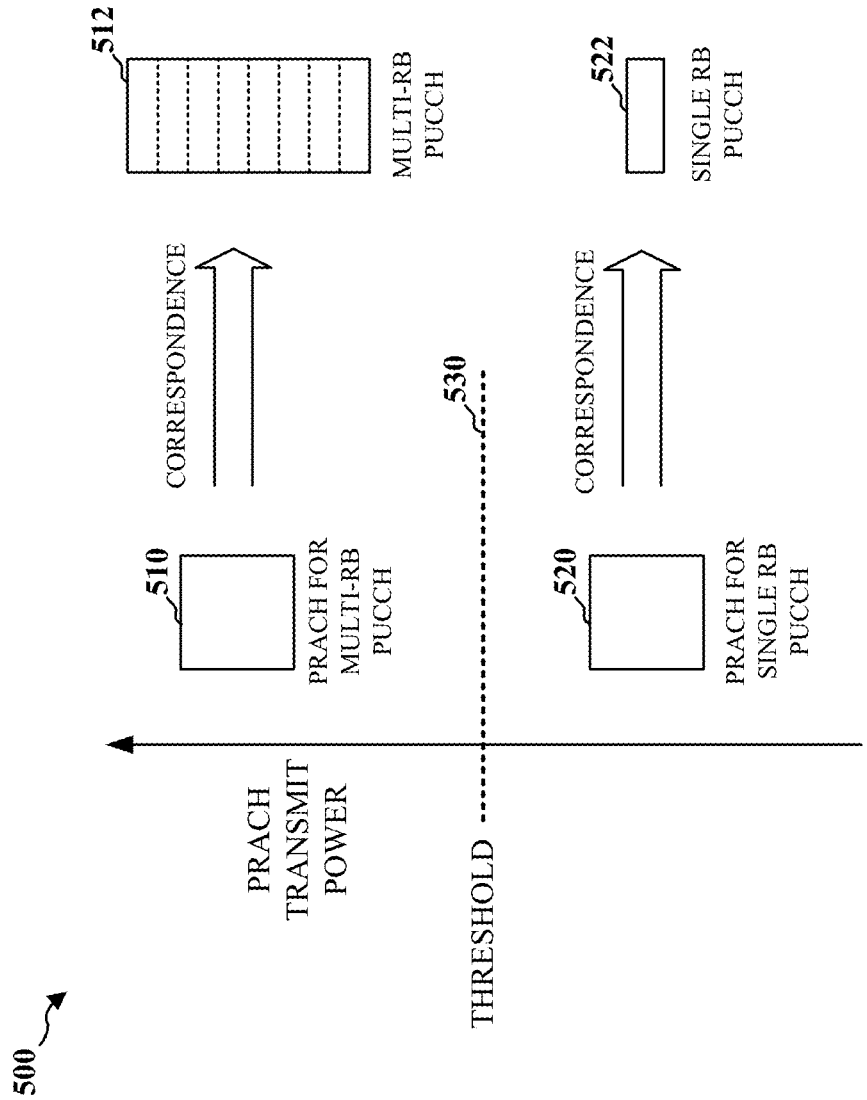
FIG. 5 illustrates a random access transmission scheme, in accordance with some aspects of the present disclosure.

FIG. 5 illustrates an example of a random access transmission scheme 500, in accordance with some aspects of the present disclosure. The random access transmission scheme 500 may be employed by BSs such as the BSs 102, 180 and 310 and UEs such as the UEs 104 and 350. In the random access transmission scheme 500, a BS 102/180 may configure multiple sets of random access resources in different frequency bands. For example, one set of random access resources 510 may be located in a first frequency band and another set of random access resources 520 may be located in a second frequency band. A UE 104 may autonomously select resources from the resources 510 in the first frequency band or from the resources 520 in the second frequency band for transmitting a random access signal.

The random access transmission scheme 500 enables the UE 104 to select between a single RB and multiple RBs with a corresponding cyclic shift step size to improve PUCCH multiplexing capacity when using contiguous frequencies. For example, the subject technology provides for having different PRACH resources for UEs requesting either a multi-RB PUCCH 512 or a single RB PUCCH 522. In some aspects, the base station can configure two sets of default PUCCH resources. For example, the base station may configure separate PRACH resources for multiple UEs using different PUCCH resources, and the base station may configure a switching point in terms of transmission power for the UE 104 to select between a PRACH resource corresponding to a single RB PUCCH and a PRACH resource corresponding to a multi-RB PUCCH. When the UE 104 is power-limited by PSD limitations and has a PRACH signal with an intended transmit power that does not exceed a reference transmit power threshold 530, the UE 104 may select resources from the resources 520 having a correspondence to the single-RB PUCCH frequency structure. Conversely, when a UE has a PRACH signal with an intended transmit power that exceeds the reference transmit power threshold 530, the UE may select resources from the resources 510 having a correspondence to the multi-RB PUCCH frequency structure.

In an implementation, the UE 104 may perform power ramping during a random access procedure. For example, at the beginning of a random access procedure, the UE 104 may select a PRACH resource from the resources 520 with correspondence to a PUCCH resource 522 having the single-RB frequency structure for a random access preamble transmission. When no random access response is received, the UE 104 may increase the transmit power for a subsequent random access transmission. When the transmit power reaches a maximum PSD level allowable in the frequency band, the UE 104 may switch to select a PRACH resource from the resources 510 with correspondence to a PUCCH resource 512 having the multi-RB frequency structure for a subsequent random access preamble transmission.

Depending in which PRACH resource set the PRACH is detected, the BS 102/180 can determine which set of PUCCH resources the UE 104 may use for the BS 102/180 to monitor for the PUCCH signal. For example, the BS 102/180 may monitor for the PUCCH signal in PUCCH resources having the single-RB frequency structure when a PRACH resource is selected from the resources 510. In another example, the BS 102/180 may monitor for the PUCCH signal in PUCCH resources having the multi-RB frequency structure when a PRACH resource is selected from the resources 520.

In some aspects, the UE 104 may receive a configuration indicating the PRACH resources 510 and 520. In some implementations, the UE 104 receives the configuration semi-statically, such as via RRC signaling. In some aspects, the configuration may include one or more parameters of the reference transmit power threshold. The parameters may indicate a distance between the UE 104 and the BS 102/180 and a mapping between the distance and the reference transmit power threshold such that the UE 104 can determine the reference transmit power threshold value from the mapping.

In some aspects, the UE 104 may transmit a PRACH signal comprising a RACH request with a first selected preamble format when the PRACH signal is transmitted on a resource from the set of random access resources 510. In other aspects, the UE 104 may transmit a PRACH signal comprising a RACH request with a second selected preamble format when the PRACH signal is transmitted on a resource from the set of random access resources 520. In some aspects, the first selected preamble format has a first length and the second selected preamble format has a second length greater than the first length.

In some aspects, the UE 104 may transmit a PRACH signal comprising a RACH request with a first preamble sequence when the PRACH signal is transmitted on a resource from the set of random access resources 510. In other aspects, the UE 104 may transmit a PRACH signal comprising a RACH request with a second preamble sequence when the PRACH signal is transmitted on a resource from the set of random access resources 520. In some aspects, the first preamble sequence and the second preamble sequence are transmitted in a same RO. In other aspects, the first preamble sequence and the second preamble sequence are transmitted in different ROs.

FIGS. 6A and 6B illustrate examples of aggregation level-based resource block structures 600 and 650, respectively, in accordance with some aspects of the present disclosure. The present disclosure provides for applying multiple intermediate RB levels (other than 10/11 RBs) to PUCCH formats 0/1 for enhancing UE multiplexing capability. In this regard, the multiple RB levels can be provided by a nested structure having multiple aggregation levels, where each aggregation level corresponds to a different RB size. For example, each aggregation level may correspond to a different number of resource blocks allocated for a physical uplink control channel (e.g., PUCCH).

As illustrated in FIG. 6A, the aggregation level-based resource block structure 600 is a first nested data structure of aggregation levels that corresponds to different RB levels such as {1RB, 2RB, 4RB, 12 RB}. For example, RB level 1RB corresponds to aggregation level 602 (denoted as "AL1"), RB level 2RB corresponds to aggregation level 604 (denoted as "AL2"), RB level 4RB corresponds to aggregation level 606 (denoted as "AL4"), and RB level 12RB corresponds to aggregation level 608 (denoted as "AL12").

As illustrated in FIG. 6B, the aggregation level-based resource block structure 650 is a second nested data structure of aggregation levels that corresponds to different RB levels such as {1 RB, 2RB, 4RB, 8RB, 16RB}. For example, RB level 1RB corresponds to aggregation level 652 (denoted as "AL1"), RB level 2RB corresponds to aggregation level 654 (denoted as "AL2"), RB level 4RB corresponds to aggregation level 656 (denoted as "AL4"), RB level 8RB corresponds to aggregation level 658 (denoted as "AL8"), and RB level 12RB corresponds to aggregation level 660 (denoted as "AL16").

In some aspects, the UE 104 may receive a downlink configuration that indicates a data structure comprising a plurality of aggregation levels. In some aspects, the downlink configuration indicates a mapping between an aggregation level and a corresponding resource block size for each of the plurality of aggregation levels. In some aspects, the downlink configuration includes a starting RB index that is preassigned to the UE 104. For example, the starting RB index, k, may be an arbitrary non-negative integer value (e.g., 0, 1, 2, . . . ). Depending on a selected aggregation level, a UE may use a corresponding RB size X for its PUCCH that starts from the preassigned starting RB index that corresponds to starting RB index k*X. For example, the UE 104 may be preassigned with a starting RB index of 2 (i.e., k=2), and the selected aggregation level (e.g., AL16) corresponds to a set of PUCCH resources that includes 16 resource blocks such that the UE 104 may transmit a PUCCH signal on a PUCCH resource starting at resource block 31 (e.g., k*X=2*16=32, where resources start at index 0) in a frequency spectrum.

Figure 7:
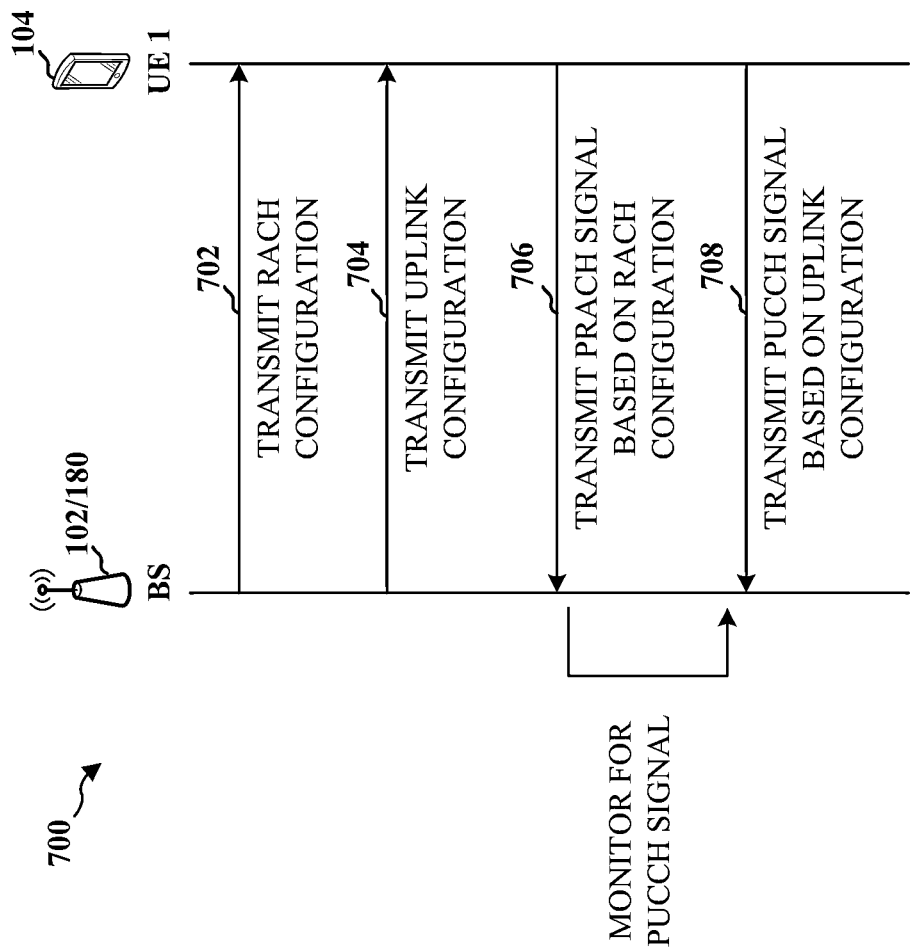
FIG. 7 is a signaling diagram of an uplink control communication process 700, in accordance with some aspects of the present disclosure.

FIG. 7 is a signaling diagram of an uplink control communication process 700, in accordance with some aspects of the present disclosure. The process 700 may be implemented among a BS and a UE. The BS may be similar to the BSs 102, 180 and 310. The UE may be similar to the UEs 104 and 350. The process 700 can be executed by computing devices (e.g., a processor, processing circuit, and/or other suitable component) of the BS 102/180 and the UE 104. As illustrated, the process 700 includes a number of enumerated steps, but implementations of the process 700 may include additional steps before, after, and in between the enumerated steps. In some implementations, one or more of the enumerated steps may be omitted or performed in a different order.

At 702, the BS 102/180 transmits a RACH configuration resources in a frequency spectrum (e.g., the frequency spectrum 490) allocated to the UE 104 for various frequency bands with PSD limitations. In an aspect, the BS 102/180 may semi-statically configure the UE 104 with a PRACH resource (e.g., resources 510, 520) that corresponds to a respective PUCCH resource having either a single-RB allocation or multi-RB allocation (e.g., single-RB allocations 462, 464, 466, or multi-RB allocations 452, 454, 456). For example, the configuration may indicate a first set of PRACH resources that corresponds to a single-RB frequency structure for uplink transmission of a PUCCH signal with a first transmission power and may indicate a second set of PRACH resources that corresponds to a multi-RB frequency structure (e.g., including contiguous frequencies) for transmission of a PUCCH signal with a second transmission power greater than the first transmission power. In an implementation, the BS may broadcast the configuration in a SIB to all UEs (e.g., including UE 1) in a network (e.g., the network 100).

The BS 102/180 may assign the resources based on a PSD parameter of the frequency spectrum, a transmit power headroom or a transmit power utilization factor (e.g., a transmit power limit) of the UE 104, channel coherency, sequence separation, and/or a numerology (e.g., an SCS) used for communicating with the UE 104. In addition, the configuration may indicate sequences assigned to the UE 104 or information for the UE 104 to generate specific baseband sequences. The baseband sequences may be used for feedback transmissions to indicate ACKs and/or NACKs.

At 706, the UE 104 may transmit a PRACH signal based on the configuration to initiate an access to the network. For example, the UE 104 may select a PRACH resource from the resources based on the UE's measured transmit power. The UE 104 may determine whether to use a first PRACH resource that corresponds to the single-RB PUCCH resource or multi-RB PUCCH resource for communicating with the BS 102/180. For example, when the UE 104 is power-limited by PSD limitations and has a PRACH signal with an intended transmit power that does not exceed a reference transmit power threshold, the UE 104 may select a PRACH resource having a correspondence to the single-RB PUCCH frequency structure. Conversely, when a UE has a PRACH signal with an intended transmit power that exceeds the reference transmit power threshold, the UE 104 may select a PRACH resource having a correspondence to the multi-RB PUCCH frequency structure. The UE 104 may transmit the PRACH signal on the selected PRACH resource. Depending in which PRACH resource set the PRACH signal is detected, the BS 102/180 can determine which set of PUCCH resources the UE 104 may use for the BS 102/180 to monitor for the PUCCH signal.

At 708, the UE 104 may transmit a PUCCH signal carrying a feedback for the reception of a downlink data signal (not shown) based on the uplink configuration. For example, the UE 104 may select a sequence from the assigned sequences and transmit the sequence using the PUCCH resources. In some aspects, the UE 104 may select a cyclic shift step size from a plurality of cyclic shift step sizes and shift the selected sequence based at least on the cyclic shift step size. In this regard, the PUCCH signal includes the shifted sequence.

Figure 8:
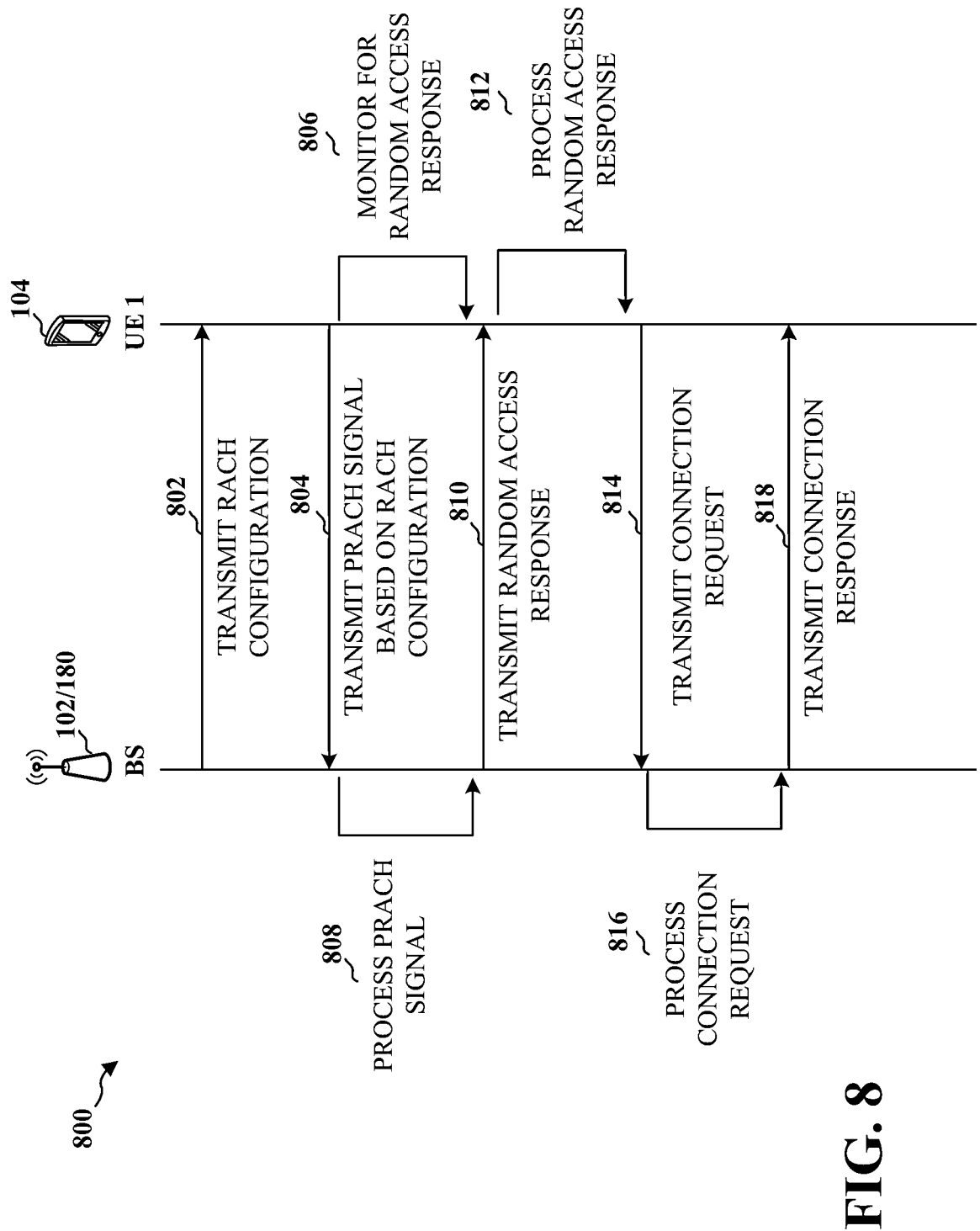
FIG. 8 is a signaling diagram of a UE-specific waveform selection process, in accordance with some aspects of the present disclosure.

FIG. 8 is a signaling diagram of a network random access process 800, in accordance with some aspects of the present disclosure. The process 800 may be implemented among a BS and a UE. The BS may be similar to the BSs 102, 180 and 310. The UE may be similar to the UEs 104 and 350. The process 800 can be executed by computing devices (e.g., a processor, processing circuit, and/or other suitable component) of the BS 102/180 and the UE 104. As illustrated, the process 800 includes a number of enumerated steps, but implementations of the process 800 may include additional steps before, after, and in between the enumerated steps. In some implementations, one or more of the enumerated steps may be omitted or performed in a different order.

At 802, the BS 102/180 transmits a RACH configuration in a network (e.g., the network 100) to the UE 104. In some implementations, the BS 102/180 may broadcast the RACH configuration in a SIB (e.g., SIB Type 2). The RACH configuration may indicate random access resources in a frequency spectrum (e.g., the frequency spectrum 490). The resources may span contiguous frequencies when the SCS in the frequency spectrum is sufficiently large (e.g., SCS of 120 KHz). The BS 102/180 may assign the PRACH resources based on a PSD parameter of the frequency spectrum, a transmit power limit of the UE 104, channel coherency, sequence separation, and/or a numerology (e.g., an SCS) used for communicating with the UE 104. In addition, the RACH configuration may indicate random access sequences or information for generating random access sequences. In some implementations, certain random access sequences may be transmitted on certain PRACH resources.

At 804, the UE 104 may transmit a PRACH signal based on the RACH configuration to initiate an access to the network. For example, the UE may select a PRACH resource from the resources based on the UE's measured transmit power. In an aspect, the UE 104 may compare the intended transmit power of a PRACH limit to a reference transmit power threshold to determine which PRACH resource to select. Depending on which PRACH resource is selected by the UE 104, its selection may correspond to a PUCCH resource for which the UE 104 would use in transmitting a PUCCH signal with a specified PUCCH format for a frequency band with PSD limitations. The PRACH signal may carry a random access sequence scrambled or coded with a random access signature. For example, depending on the selection, the PRACH signal may span K contiguous RBs 470. Alternatively, the PRACH signal may span contiguous subcarriers in K contiguous RBs 610.

At 806, after transmitting the PRACH signal, the UE 104 may monitor for a random access response.

At 808, upon detecting the PRACH signal, the BS 102/180 processes the PRACH signal. For example, the BS 102/180 may monitor for a PRACH signal in the resources indicated in the configuration and based on the sequences indicated in the configuration. The BS 102/180 may determine uplink transmission timing of the UE 104 and assign a UL resource and a temporary identifier (ID) to the UE 104 for sending a subsequent message based on the received PRACH signal. The UL resource may or may not be distributed over the frequency spectrum as shown in the resource configuration 400 or random access transmission scheme 500 described above. The BS 102/180 may identify a next message (e.g., a connection request) from the UE 104 by the temporary ID.

At 810, the BS 102/180 transmits a random access response indicating the timing advance information, the uplink resource, and the temporary ID. In some aspects, the BS 102/180 may indicate within the random access response as to which aggregation level (corresponding to RB size) to use for a subsequent uplink control message (e.g., PUCCH format 0/1).

At 812, upon receiving the random access response, the UE 104 processes the random access response. The UE 104 may obtain information associated with the UL resource, the temporary ID, and the timing advance information from the random access response. The UL resource may correspond to information indicating which aggregation level to selected from the nested data structure of aggregation levels such that the UE 104 can transmit a PUCCH signal on a single-RB resource or multi-RB resource depending on the transmit power of the transmitted PRACH signal and/or the measured uplink transmission timing by the BS 102/180. In some aspects, the random access response may indicate a mapping between the aggregation level and a corresponding RB size such that the UE 104 can determine which RBs to use based on the mapping and the indicated aggregation level.

At 814, the UE 104 transmits a connection request to the BS 102/180 based on the UL resource, the temporary ID, and the timing advance information. In some aspects, the connection request may include a PUCCH signal that includes the UCI. The PUCCH signal may be transmitted with formats 0/1 across a single-RB resource or multi-RB resource while satisfying the PSD requirements of the frequency band.

At 816, upon receiving the connection request, the BS 102/180 processes the connection request. At 818, the BS 102/180 acknowledges the connection request by transmitting a connection response to the UE 104.

In the context of NR, the random access signature may be referred to as a random access-radio network temporary identifier (RA-RNTI). The temporary ID may be referred to as a temporary cell-radio network temporary identifier (C-RNTI). The PRACH signal, the random access response, the connection request, and the connection response may be referred to as message 1, message 2, message 3, and message 4, respectively.

Figure 9:
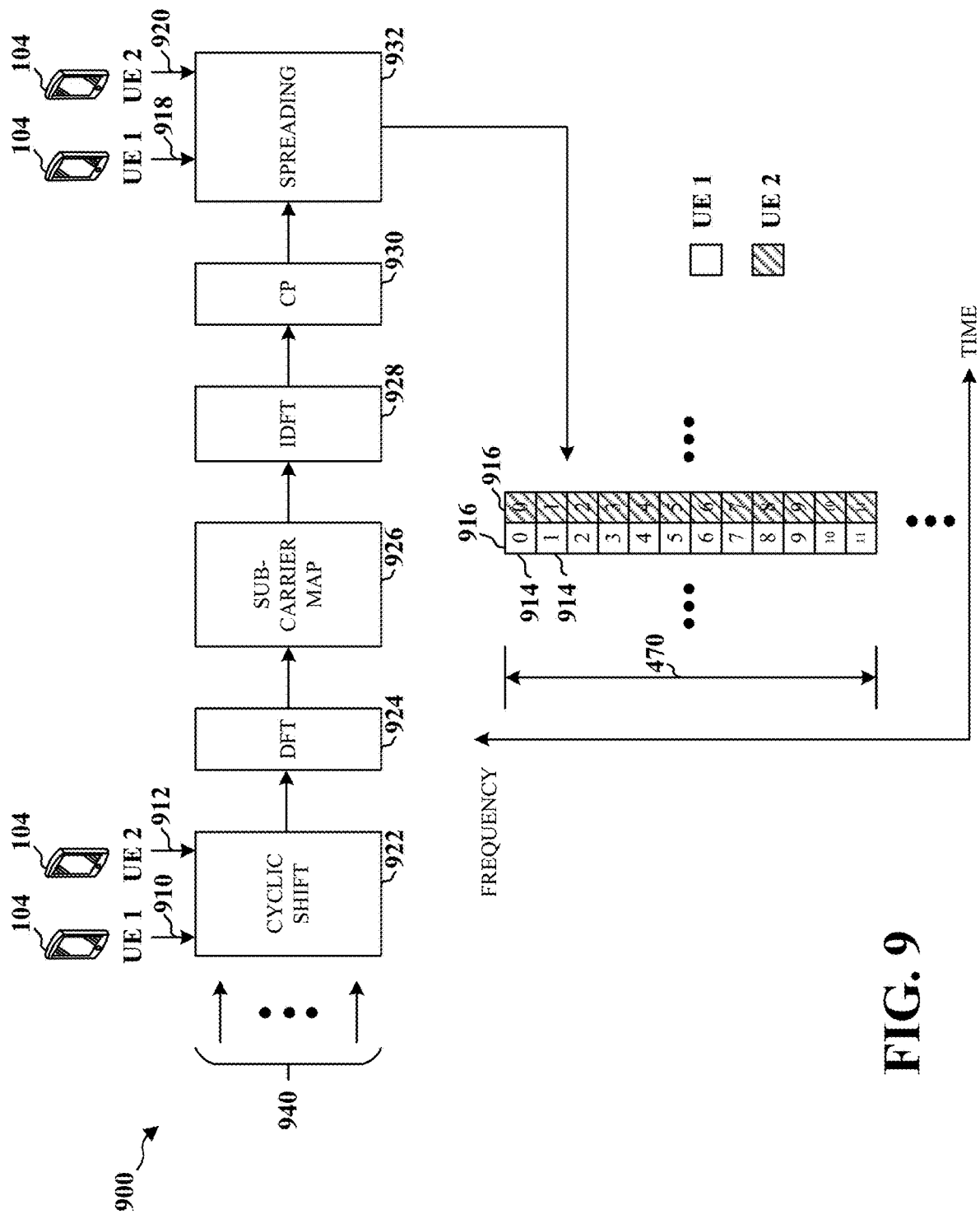
FIG. 9 illustrates an uplink control channel multiplexing scheme for PUCCH signals of formats 0/1, in accordance with some aspects of the present disclosure.

FIG. 9 illustrates an uplink control channel multiplexing scheme 900 for PUCCH signals of formats 0/1, in accordance with some aspects of the present disclosure. The uplink control channel multiplexing scheme 900 may be employed by UEs such as the UEs 104 and 350 and BSs such as the BSs 102, 180 and 310. The uplink control channel multiplexing scheme 900 multiplexes PUCCH signals 940 from different UEs 104 (e.g., UE 1, UE 2) on the same resource (e.g., single-RB resource, multi-RB resource) by applying pre-DFT cyclic-shift separation and time spreading across single-carrier symbols 916. In some aspects, the PUCCH signal 940 with format 0 may include between about one symbol 916 to about two symbols 916. In some aspects, the PUCCH signal 940 with format 1 may include between about four symbols 916 to about fourteen symbols 916. In some aspects, the PUCCH signal 940 may include a UCI and a DMRS. For simplicity of discussion and brevity of explanation, FIG. 9 illustrates the multiplexing over two symbols 916, but the implementations of the present disclosure can be scaled to multiplex over any suitable number of symbols 916 (e.g., between about four symbols 916 to about fourteen symbols 916).

For example, a BS 102/180 may schedule the UE 1 and the UE 2 to transmit on the same RB 470. The BS 102/180 may assign the UE 1 with a cyclic-shift value 910 for cyclically shifting a predetermined sequence and a time spreading sequence 918 for spreading across single-carrier symbols 916. The BS 102/180 may assign the UE 2 with a cyclic-shift value 912 for cyclically shifting a predetermined sequence and a time spreading sequence 920 orthogonal to the time spreading sequence 918 for spreading across single-carrier symbols 916. The cyclic-shift values 910 and 912 may be applied to a sequence (e.g., a constant amplitude zero autocorrelation (CAZAC) sequence) where cyclic-shifted versions of the sequence are orthogonal to each other.

The uplink control channel multiplexing scheme 900 includes a cyclic-shift separation component 922, a DFT component 924, a subcarrier mapping component 926, an inverse discrete Fourier transform (IDFT) component 928, a CP component 930, and a spreading component 932. The cyclic-shift separation component 922, the DFT component 924, the subcarrier mapping component 926, the IDFT component 928, the CP component 930, and the spreading component 932 may be implemented using software and/or hardware components at a UE (e.g., the UEs 104 and 350, the UE 1, and the UE 2).

The cyclic-shift separation component 922 cyclically shifts a sequence (e.g., a CAZAC sequence) and multiplies modulation symbols of an input PUCCH signal 940 by the cyclically shifted sequence. For example, at the UE 1, the cyclic-shift separation component 922 may apply the cyclic-shift value 910 for the cyclic-shifting. Alternatively, at the UE 2, the cyclic-shift separation component 922 may apply the cyclic-shift value 912 for the cyclic-shifting.

In some aspects, the cyclic-shift separation component 922 may select a cyclic shift step size from a plurality of cyclic shift step sizes. The cyclic-shift separation component 922 may shift a baseband sequence based at least on the cyclic shift step size. In some aspects, the cyclic shift step size is a fixed value across different resource block sizes that correspond to respective ones of the plurality of aggregation levels, as described in reference to FIGS. 6A and 6B. Alternatively, the cyclic shift step size is based on a resource block size that corresponds to the selected aggregation level, as described in reference to FIGS. 6A and 6B.

Figure 10:
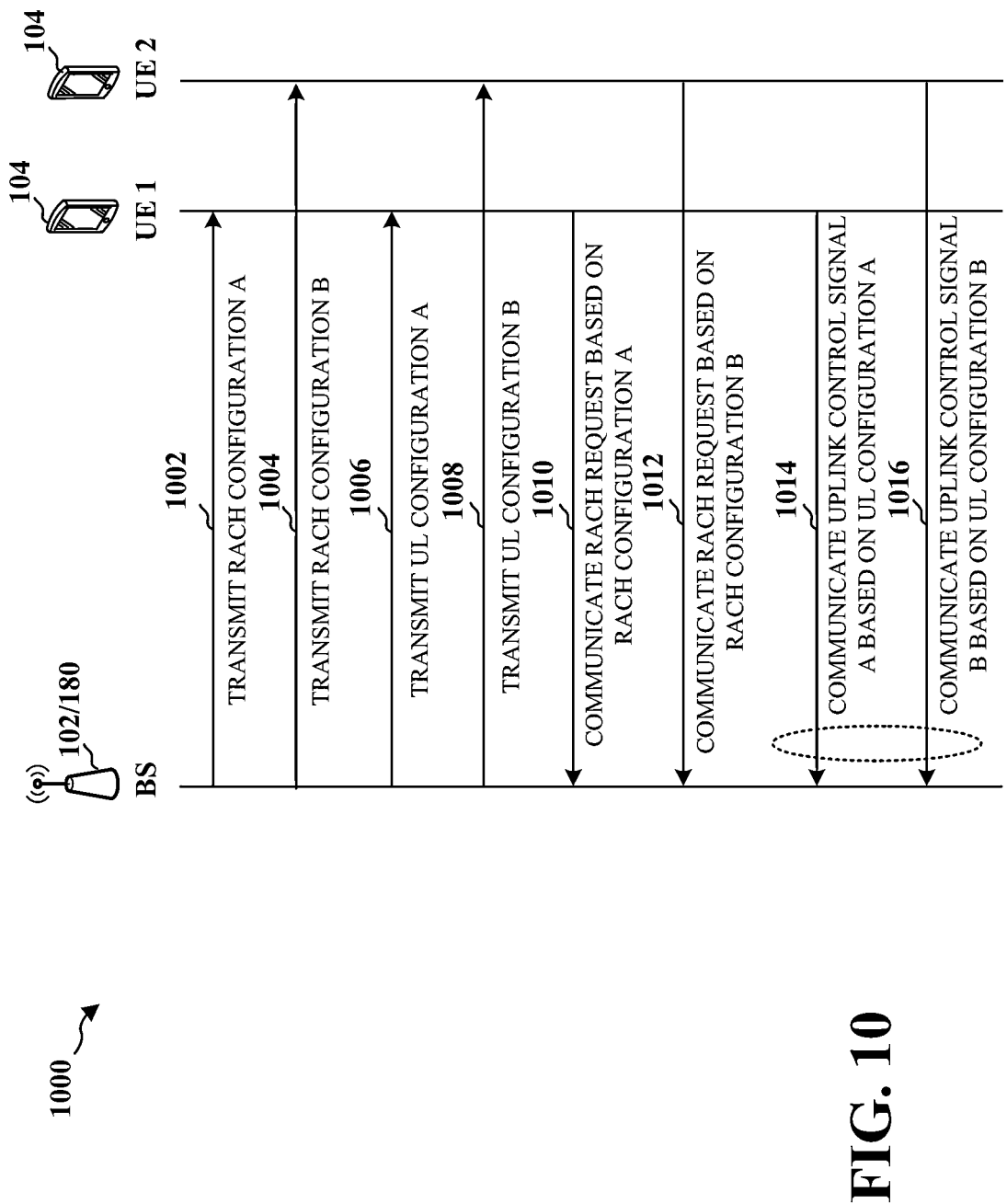
FIG. 10 is a signaling diagram of an uplink control channel communication process, in accordance with some aspects of the present disclosure.

FIG. 10 is a signaling diagram of an uplink control channel communication process 1000, in accordance with some aspects of the present disclosure. The process 1000 is implemented among a BS, a UE 1, and a UE 2. The BS may be similar to the BSs 102, 180 and 310. The UEs 1 and 2 may be similar to the UEs 104 and 350. The process 1000 can be executed by computing devices (e.g., a processor, processing circuit, and/or other suitable component) of the BS and the UEs 1 and 2. As illustrated, the process 1000 includes a number of enumerated steps, but implementations of the process 1000 may include additional steps before, after, and in between the enumerated steps. In some implementations, one or more of the enumerated steps may be omitted or performed in a different order.

At 1002, the BS 102/180 transmits a RACH configuration A to the UE 1. The BS 102/180 may include configuration information that is associated with the UE 1 in a PRACH transmission. For example, the RACH configuration A may indicate a first set of PRACH resources allocated to the UE 1 that correspond to a single-RB PUCCH allocation and a second set of PRACH resources allocated to the UE 1 that correspond to a multi-RB PUCCH allocation.

At 1004, the BS 102/180 transmits a RACH configuration B to the UE 2. Similarly, the BS 102/180 may include configuration information that is associated with the UE 2 in a PRACH transmission. For example, the RACH configuration B may indicate a first set of PRACH resources allocated to the UE 2 that correspond to a single-RB PUCCH allocation and a second set of PRACH resources allocated to the UE 2 that correspond to a multi-RB PUCCH allocation. In some implementations, the BS 102/180 may transmit the RACH configurations to the UE 1 and the UE 2 via RRC messages.

In some aspects, the BS 102/180 may determine respective UL configurations for multiplexing PUCCH signals from the UE 1 and the UE 2 on a frequency spectrum (e.g., the frequency spectrum 490). The PUCCH signals may correspond to one of a short PUCCH format 0 signal or a long PUCCH format 1 signal. The BS 102/180 may determine a multiplex configuration based on the PUCCH format (e.g. format 0, 1) of the PUCCH signals and/or a link budget and/or power utilization factors of the UE 1 and the UE 2.

At 1006, the BS 102/180 transmits an uplink configuration A to the UE 1. The BS 102/180 may include configuration information that is associated with the UE 1 in a PUCCH transmission. For example, the uplink configuration A may indicate the single-RB PUCCH resources and multi-RB PUCCH resources allocated to the UE 1.

At 1008, the BS 102/180 transmits an uplink configuration B to the UE 2. Similarly, the BS 102/180 may include configuration information that is associated with the UE 2 in a PUCCH transmission. For example, the uplink configuration B may indicate the single-RB PUCCH resources and multi-RB PUCCH resources allocated to the UE 2. In some implementations, the BS 102/180 may transmit the uplink configurations to the UE 1 and the UE 2 via RRC messages or via a random access response message.

In an implementation, the UE 104 may select a single-RB frequency structure or a multi-RB frequency structure for transmission of a PUCCH signal based on a comparison between an intended transmit power of a PRACH signal transmission and a reference transmit power threshold. The threshold may represent a power headroom of the UE 104 and/or a PSD parameter (e.g., a PSD limit or a range of allowable PSD levels) of a frequency band. For example, the UE 104 may select a first PRACH resource that corresponds to a single-RB frequency structure when the transmit power of the PRACH signal does not exceed the threshold and may select a second PRACH resource that corresponds to a multi-RB frequency structure when the transmit power of the PRACH signal exceeds the threshold.

At 1010, the UE 1 communicates a RACH request based on the received RACH configuration A.

At 1012, the UE 2 communicates a RACH request based on the received RACH configuration B.

At 1014, the UE 1 communicates a PUCCH signal based on the received uplink configuration A. For example, UE 1 may use a single-RB resource when UE 1 transmits the RACH request at 1010 on a PRACH resource that corresponds to the single-RB resource. In another example, UE 1 may use a multi-RB resource when UE 1 transmits the RACH request at 1010 on a PRACH resource that corresponds to the multi-RB resource.

At 1016, the UE 2 communicates a PUCCH signal based on the received uplink configuration B. For example, UE 2 may use a single-RB resource when UE 2 transmits the RACH request at 1012 on a PRACH resource that corresponds to the single-RB resource. In another example, UE 2 may use a multi-RB resource when UE 2 transmits the RACH request at 1012 on a PRACH resource that corresponds to the multi-RB resource.

In some implementations, the UE 1 and the UE 2 may transmit the PUCCH signals using the same time-frequency resources or the same RBs (e.g., the RBs 210). In this respect, the BS 102/180 may configure each of UE 1 and UE 2 with a different cyclic shift step size such that their uplink transmission are cyclically-shifted from one another. For example, UE 1 may use a cyclic shift step size from a first set of cyclic shift step sizes $\{0, 3, 6, 9\}$, whereas UE 2 may use a cyclic shift step size from a second set of cyclic shift step sizes $\{1, 4, 7, 10\}$. In other implementations, the UE 1 and the UE 2 may transmit the PUCCH signals using different portions or different RBs that span contiguous frequencies of a frequency spectrum.

Figure 11:
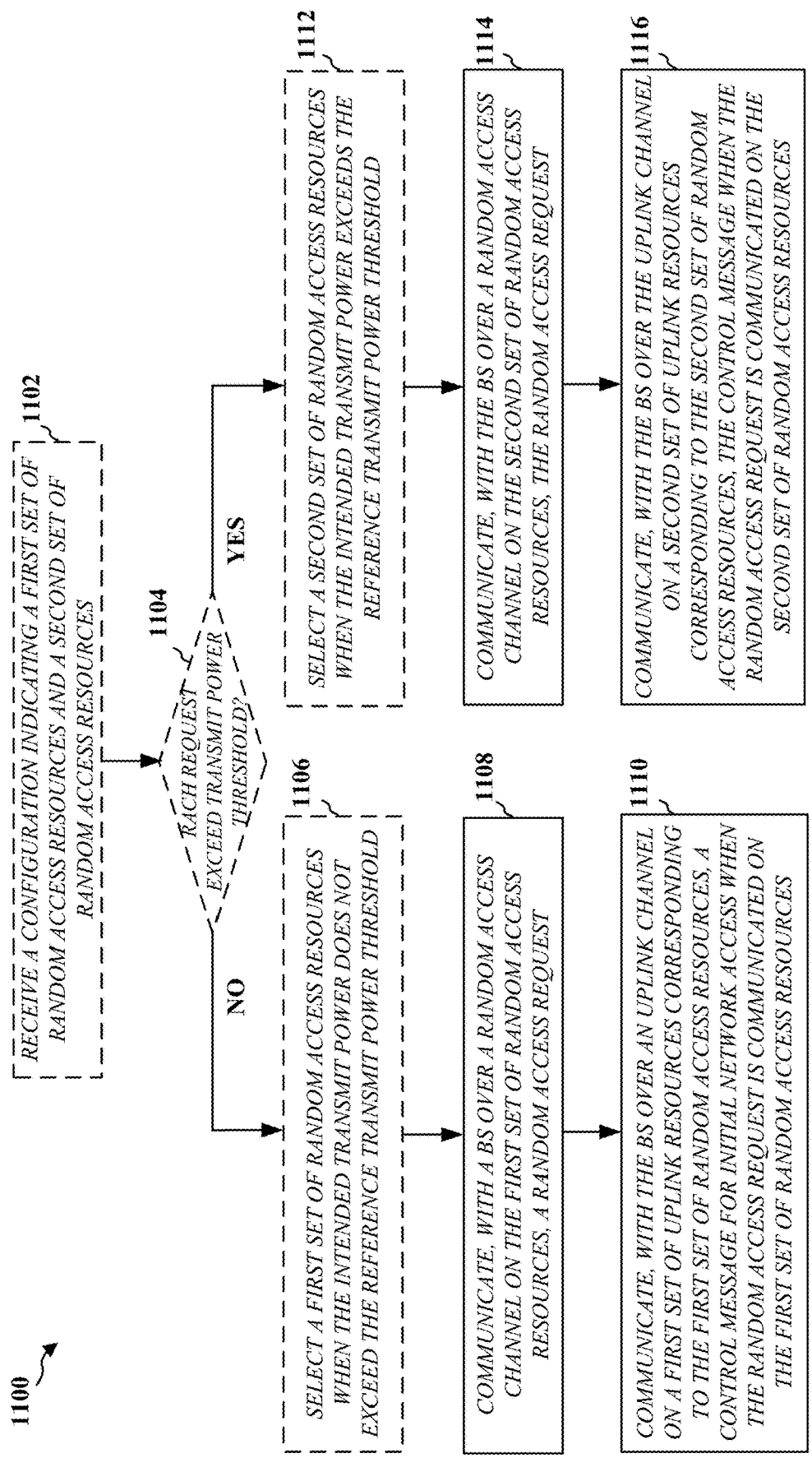
FIG. 11 is a flowchart of a process of wireless communication at a user equipment for coexistence of multiple uplink control channel formats for wireless communication with power spectral density limitation, in accordance with some aspects of the present disclosure.

FIG. 11 is a flowchart of a process 1100 of wireless communication for multiplexing of overlapped uplink channel transmission repetitions at a user equipment, in accordance with some aspects of the present disclosure. The process 1100 may be performed by a UE (e.g., the UE 104; UE 350). As illustrated, the process 1100 includes a number of enumerated steps, but implementations of the process 1100 may include additional steps before, after, and in between the enumerated steps. In some implementations, one or more of the enumerated steps may be omitted or performed in a different order.

At 1102, the UE may receive a RACH configuration indicating a first set of random access resources and a second set of random access resources. The UE can receive the configuration, e.g., as described in connection with FIGS. 1 and 5-10. In some aspects, the UE may receive, from the BS over a downlink channel, a RRC message that includes the RACH configuration indicating the first set of random access resources and the second set of random access resources.

At 1104, the UE may determine whether an intended transmit power of a random access request exceeds a reference transmit power threshold based on a comparison between the intended transmit power of the random access request and the reference transmit power threshold. The UE can perform the comparison, e.g., as described in connection with FIGS. 5, 7, 8 and 10. If the process 1100 determines that the random access request does not exceed the reference transmit power threshold, then the process 1100 proceeds to block 1106. Otherwise, the process 1100 proceeds to block 1112 when the process 1100 determines that the random access request exceeds the reference transmit power threshold.

At 1106, the UE may select a first set of random access resources when the intended transmit power does not exceed the reference transmit power threshold. The UE can select the first set of random access resources, e.g., as described in connection with FIGS. 1-5, 7, 8 and 10.

In some aspects, the RACH configuration includes one or more parameters of the reference transmit power threshold. In some aspects, the one or more parameters indicate a distance between the UE and the BS and a mapping between the distance and the reference transmit power threshold. In this regard, the UE may determine the reference transmit power threshold based on the mapping.

At 1108, the UE may communicate, with the BS over a random access channel on the first set of random access resources, a random access request. The UE can communicate the random access request, e.g., as described in connection with FIGS. 1-5, 7, 8 and 10. In some aspects, the UE may transmit the random access request with a first selected preamble format when the random access request is transmitted on the first set of random access resources. In other aspects, the UE may transmit the random access request that includes a first preamble sequence when the random access request is transmitted on the first set of random access resources.

At 1110, the UE may communicate, with the BS over an uplink channel on a first set of uplink resources corresponding to the first set of random access resources, a control message for initial network access when the random access request is communicated on the first set of random access resources. The UE can communicate the control message, e.g., as described in connection with FIGS. 1-10.

At 1112, the UE may select a second set of random access resources when the intended transmit power exceeds the reference transmit power threshold. The UE can select the second set of random access resources, e.g., as described in connection with FIGS. 1-5, 7, 8 and 10.

At 1114, the UE may communicate, with the BS over the random access channel on the second set of random access resources, the random access request. The UE can communicate the random access request, e.g., as described in connection with FIGS. 1-5, 7, 8 and 10. In some aspects, the UE may transmit the random access request with a second selected preamble format when the random access request is transmitted on the second set of random access resources. In some aspects, the first selected preamble format has a first length and the second selected preamble format has a second length greater than the first length. In other aspects, the UE may transmit the random access request that includes a second preamble sequence when the random access request is transmitted on the second set of random access resources. In some aspects, the first preamble sequence and the second preamble sequence are transmitted in a same random access channel occasion. In other aspects, the first preamble sequence and the second preamble sequence are transmitted in different random access channel occasions.

At 1116, the UE may communicate, with the BS over the uplink channel on a second set of uplink resources corresponding to the second set of random access resources, the control message for initial network access when the random access request is communicated on the second set of random access resources. The UE can communicate the control message, e.g., as described in connection with FIGS. 1-10.

In some aspects, the first set of uplink resources includes a first number of uplink resources and the second set of uplink resources comprises a second number of uplink resources greater than the first number of uplink resources. For example, the first number of uplink resources may correspond to a single resource block allocated for a physical uplink control channel (e.g., PUCCH format 0/1) such that the UE may transmit, to the BS over the uplink channel within the single resource block, the control message. In other aspects, the second set of uplink resources may correspond to a plurality of contiguous resource blocks allocated for the physical uplink control channel such that the UE may transmit, to the BS over the uplink channel, the control message spanning across the plurality of contiguous resource blocks.

In some aspects, the UE may receive, from the BS over a downlink channel, a radio resource control (RRC) message that includes a first configuration that indicates the first set of uplink resources and the second set of uplink resources. In some aspects, the first configuration indicates a data structure having a plurality of aggregation levels, where each of the plurality of aggregation levels corresponds to a different number of resource blocks allocated for a physical uplink control channel (e.g., PUCCH format 0/1). For example, an aggregation level 16 (denoted as AL16) may correspond to an allocation with a resource block size of 16 (or 16 contiguous resource blocks). In another example, an aggregation level 1 (denoted as AL1) may correspond to an allocation with a resource block size of 1 (or 1 resource block). In some aspects, the UE may receive, from the BS over a downlink channel, an indication of which aggregation level of the plurality of aggregation levels is allocated to the UE. In this regard, the UE may select one of the plurality of aggregation levels based on the indication. In some aspects, the first configuration also indicates a mapping between an aggregation level and a corresponding resource block size for each of the plurality of aggregation levels. In this regard, the UE may determine the corresponding RB size based on the mapping with the aggregation level and transmit the control message at a starting resource block index that spans the corresponding resource block size.

In some aspects, the UE may select a cyclic shift step size from a plurality of cyclic shift step sizes. The UE may shift a baseband sequence based at least on the cyclic shift step size to perform cyclic-shift separation of the outgoing control message that is orthogonal to control messages of other UEs that may be allocated to share the same RB. In this regard, the control message may include the shifted baseband sequence. In some aspects, the cyclic shift step size is a fixed value across different resource block sizes that correspond to respective ones of the plurality of aggregation levels. In other aspects, the cyclic shift step size is based on a resource block size that corresponds to the selected aggregation level.

In some aspects, the control message is communicated on a subband that includes a plurality of PUCCHs. In this regard, the UE may transmit the control message in a selected PUCCH of the plurality of PUCCHs. In some aspects, the selected PUCCH has a first format corresponding to PUCCH format 0 or a second format corresponding to PUCCH format 1.

Figure 12:
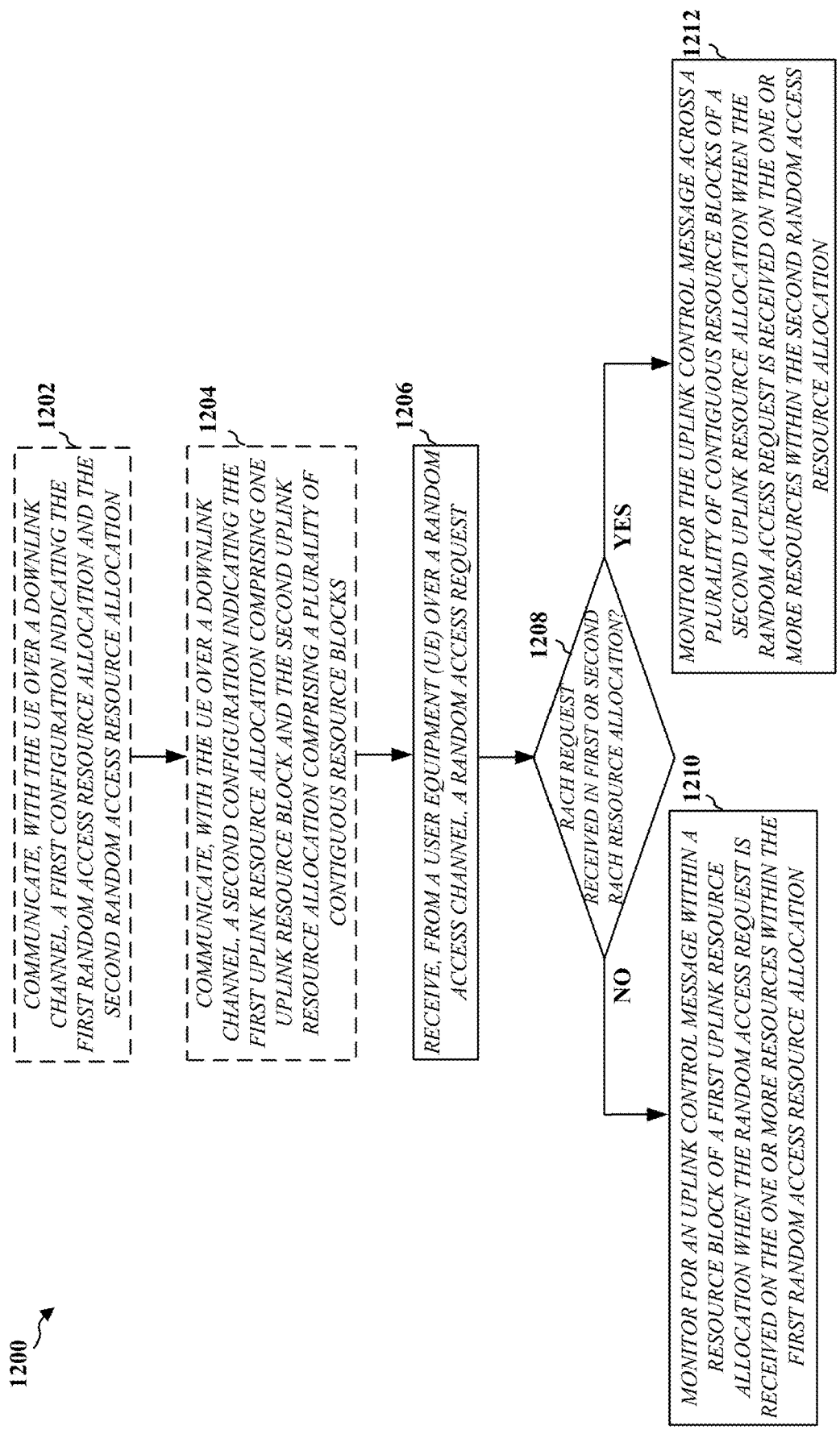
FIG. 12 is a flowchart of a process of wireless communication at a base station for coexistence of multiple uplink control channel formats for wireless communication with power spectral density limitation, in accordance with some aspects of the present disclosure.

FIG. 12 is a flowchart of a process 1200 of wireless communication for multiplexing of overlapped uplink channel transmission repetitions at a base station, in accordance with some aspects of the present disclosure. The process 1200 may be performed by a BS (e.g., the BS 102, 180; base station 310). As illustrated, the process 1200 includes a number of enumerated steps, but implementations of the process 1200 may include additional steps before, after, and in between the enumerated steps. In some implementations, one or more of the enumerated steps may be omitted or performed in a different order.

At 1202, the BS may communicate, with the UE over a downlink channel, a first configuration indicating the first random access resource allocation and the second random access resource allocation. The BS can communicate the first configuration, e.g., as described in connection with FIGS. 1 and 5-10.

At 1204, the BS may communicating, with the UE over a downlink channel, a second configuration indicating the first uplink resource allocation comprising one uplink resource block and the second uplink resource allocation comprising a plurality of contiguous resource blocks. The BS can communicate the second configuration, e.g., as described in connection with FIGS. 1 and 5-10. In some aspects, the first random access resource allocation corresponds to the first uplink resource allocation and the second random access resource allocation corresponds to the second uplink resource allocation.

At 1206, the BS may receive, from a UE over a random access channel, a random access request. The BS can receive the random access request, e.g., as described in connection with FIGS. 1-5, 7, 8 and 10.

At 1208, the BS may determine whether the random access request is received on one or more resources within a first random access resource allocation or a second random access resource allocation. The BS can perform the monitoring, e.g., as described in connection with FIGS. 1-5, 7, 8 and 10.

At 1210, the BS may monitor for an uplink control message within a resource block of a first uplink resource allocation when the random access request is received on the one or more resources within the first random access resource allocation. The BS can monitor for the uplink control message within the first uplink resource allocation, e.g., as described in connection with FIGS. 1-10.

At 1212, the BS may monitor for the uplink control message across a plurality of contiguous resource blocks of a second uplink resource allocation when the random access request is received on the one or more resources within the second random access resource allocation. The BS can monitor for the uplink control message within the second uplink resource allocation, e.g., as described in connection with FIGS. 1-10.

Figure 13:
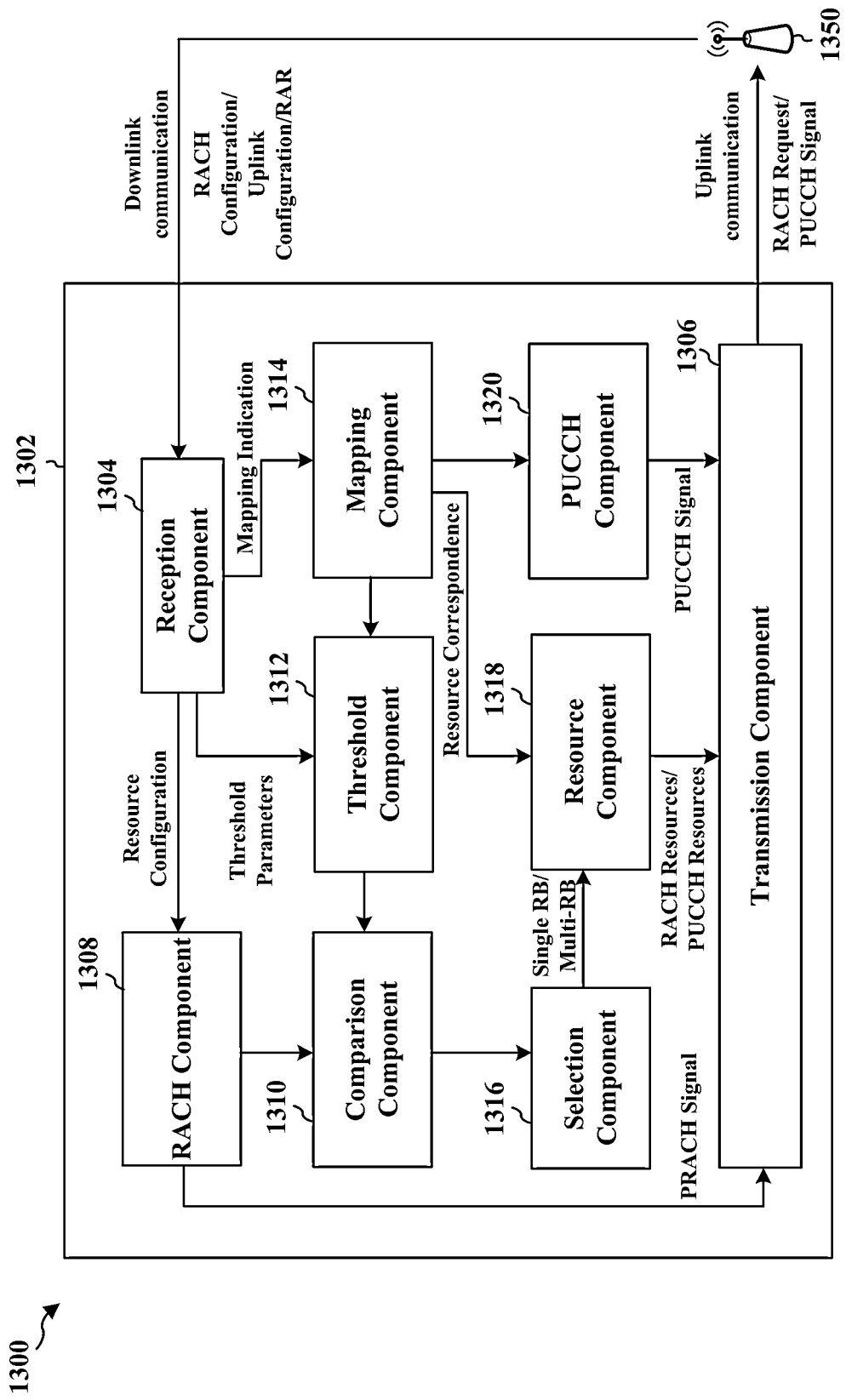
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE (e.g., UE 104, 350, 1302, 1302') in wireless communication with base station 1350.

The apparatus includes a reception component 1304 that receives downlink communication from the base station 1350. The reception component 1304 may be configured to receive signals and/or other information from other devices including, e.g., base station 1350. The signals/information received by the reception component 1304 may be provided to one or more components of the apparatus 1302 for further processing and use in performing various operations in accordance with the methods discussed supra including the processes of the aforementioned flowchart 1100. Thus, via the reception component 1304, the apparatus 1302 and/or one or more components therein receive signals and/or other information (e.g., such as downlink data for the apparatus 1302 and/or other control signaling) from the base station 1350 as discussed supra and also discussed more specifically infra. In one or more implementations, the reception component 1304 may be implemented, for example, in the RX processor 356 with reference to FIG. 3.

In some aspects, the reception component 1304 is configured to receive a RACH configuration indicating a first set of random access resources and a second set of random access resources, e.g., as described in connection with block 1102 of FIG. 11. In some aspects, the reception component 1304 can receive, from the BS over a downlink channel, a RRC message that includes the RACH configuration indicating the first set of random access resources and the second set of random access resources.

The apparatus includes a RACH component 1308 configured to generate a random access request for requesting initial access to a network. In some aspects, the RACH component 1308 generates the random access request with a first selected preamble format. In other aspects, the RACH component 1308 generates the random access request with a second selected preamble format. In some aspects, the first selected preamble format has a first length and the second selected preamble format has a second length greater than the first length. In some aspects, the RACH component 1308 provides the random access request to the transmission component 1306 for transmission. In one or more implementations, the RACH component 1308 may be implemented, for example, in any combination of the RX processor 356, the TX processor 368, and/or the controller/processor 359 with reference to FIG. 3.

The apparatus includes a comparison component 1310 configured to determine whether an intended transmit power of a random access request exceeds a reference transmit power threshold based on a comparison between the intended transmit power of the random access request and the reference transmit power threshold, e.g., as described in connection with block 1104 of FIG. 11. In one or more implementations, the comparison component 1310 may be implemented, for example, in any combination of the RX processor 356, the TX processor 368, and/or the controller/processor 359 with reference to FIG. 3.

The apparatus includes a threshold component 1312 configured to determine the reference transmit power threshold based on a mapping between the distance and the reference transmit power threshold. In some aspects, the RACH configuration includes one or more parameters of the reference transmit power threshold. In some aspects, the one or more parameters indicate a distance between the UE and the BS and the mapping. In one or more implementations, the threshold component 1312 may be implemented, for example, in any combination of the RX processor 356, the TX processor 368, and/or the controller/processor 359 with reference to FIG. 3.

The apparatus includes a mapping component 1314 configured to receive the one or more parameters that indicate a distance between the UE and the BS and indicate the mapping between the distance and the reference transmit power threshold. In this regard, the mapping component 1314, in coordination with the threshold component 1312, may determine the reference transmit power threshold based on the mapping. In one or more implementations, the mapping component 1314 may be implemented, for example, in any combination of the RX processor 356, the TX processor 368, and/or the controller/processor 359 with reference to FIG. 3.

The apparatus includes a selection component 1316 configured to select a first set of random access resources when the intended transmit power does not exceed the reference transmit power threshold, e.g., as described in connection with block 1106 of FIG. 11. In some aspects, the selection component 1316 can select a second set of random access resources when the intended transmit power exceeds the reference transmit power threshold, e.g., as described in connection with block 1112 of FIG. 11. In this regard, the selection component 1316 may provide a first selection control signal to the resource component 1318. In some aspects, the selection component 1316 is also configured to select between a first set of uplink resources and a second set of uplink resources based on which random access resources the random access request was transmitted. In this regard, the selection component 1316 may provide a second selection control signal to the resource component 1318. In one or more implementations, the selection component 1316 may be implemented, for example, in any combination of the RX processor 356, the TX processor 368, and/or the controller/processor 359 with reference to FIG. 3.

The apparatus includes a resource component 1318 configured to use a first set of random access resources for transmission of the random access request when the intended transmit power does not exceed the reference transmit power threshold. The resource component 1318 is also configured to use a second set of random access resources for transmission of the random access request when the intended transmit power exceeds the reference transmit power threshold. The resource component 1318 may receive a first selection control signal from the selection component 1316 for selecting between the first and second sets of random access resources. In some aspects, the resource component 1318 is configured to use a first set of uplink resources for transmission of a PUCCH signal when the first set of random access resources are utilized for transmission of the random access request. In other aspects, the resource component 1318 is also configured to use a second set of uplink resources for transmission of a PUCCH signal when the second set of random access resources are utilized for transmission of the random access request. The resource component 1318 may receive a second selection control signal from the selection component 1316 for selecting between the first and second sets of uplink resources. The resource component 1318 may receive a resource correspondence signal from the mapping component 1314 that indicates a mapping between the selected uplink resources and the PUCCH signal. In some aspects, the resource component 1318 provides the selected resources to the transmission component 1306 for facilitating transmission of the random access request and uplink control message. In one or more implementations, the resource component 1318 may be implemented, for example, in any combination of the RX processor 356, the TX processor 368, and/or the controller/processor 359 with reference to FIG. 3.

The apparatus includes a PUCCH component 1320 configured to generate an uplink control message (e.g., PUCCH) for transmission to the BS over an uplink channel on a first set of uplink resources that corresponds to the first set of random access resources, when the random access request is communicated on the first set of random access resources. The PUCCH component 1320 may receive an indication from the mapping component 1314 as to which PUCCH signal to map with the allocated PUCCH resources since the mapping component 1314 may determine their mapping with an indication of a selected aggregation level. The aggregation level may correspond to a RB size (e.g., single-RB resource, multi-RB resource). In some aspects, the PUCCH component 1320 provides the generated uplink control message to the transmission component 1306 for transmission. In one or more implementations, the PUCCH component 1308 may be implemented, for example, in any combination of the TX processor 368 and/or the controller/processor 359 with reference to FIG. 3.

The apparatus includes a transmission component 1306 that transmits uplink communication to the base station 1350. The transmission component 1306 may be configured to transmit various messages to one or more external devices, e.g., including the base station 1350, in accordance with the methods disclosed herein. The messages/signals to be transmitted may be generated by one or more other components as discussed above, or the messages/signals to be transmitted may be generated by the transmission component 1306 under the direction/control of the one or more other components discussed supra. Thus, in various configurations, via the transmission component 1306, the apparatus 1302 and/or one or more components therein transmit signals and/or other information (e.g., such as uplink data, control messages and/or other signals) to external devices such as the base station 1350. In some aspects, the transmission component 1306 is configured to communicate, with the BS over a random access channel on the first set of random access resources, a random access request when the random access request is communicated on the first set of random access resources, e.g., as described in connection with block 1108 of FIG. 11. In some aspects, the transmission component 1306 is configured to communicate, with the BS over the random access channel on the second set of random access resources, the random access request when the random access request is communicated on the second set of random access resources, e.g., as described in connection with block 1114 of FIG. 11. In some aspects, the transmission component 1306 is configured to communicate, with the BS over an uplink channel on the first set of uplink resources corresponding to the first set of random access resources, a control message for initial network access when the random access request is communicated on the first set of random access resources, e.g., as described in connection with block 1110 of FIG. 11. In some aspects, the transmission component 1306 is configured to communicate, with the BS over the uplink channel on the second set of uplink resources corresponding to the second set of random access resources, the control message for initial network access when the random access request is communicated on the second set of random access resources, e.g., as described in connection with block 1116 of FIG. 11. In one or more implementations, the transmission component 1306 may be implemented, for example, in the TX processor 368 with reference to FIG. 3.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
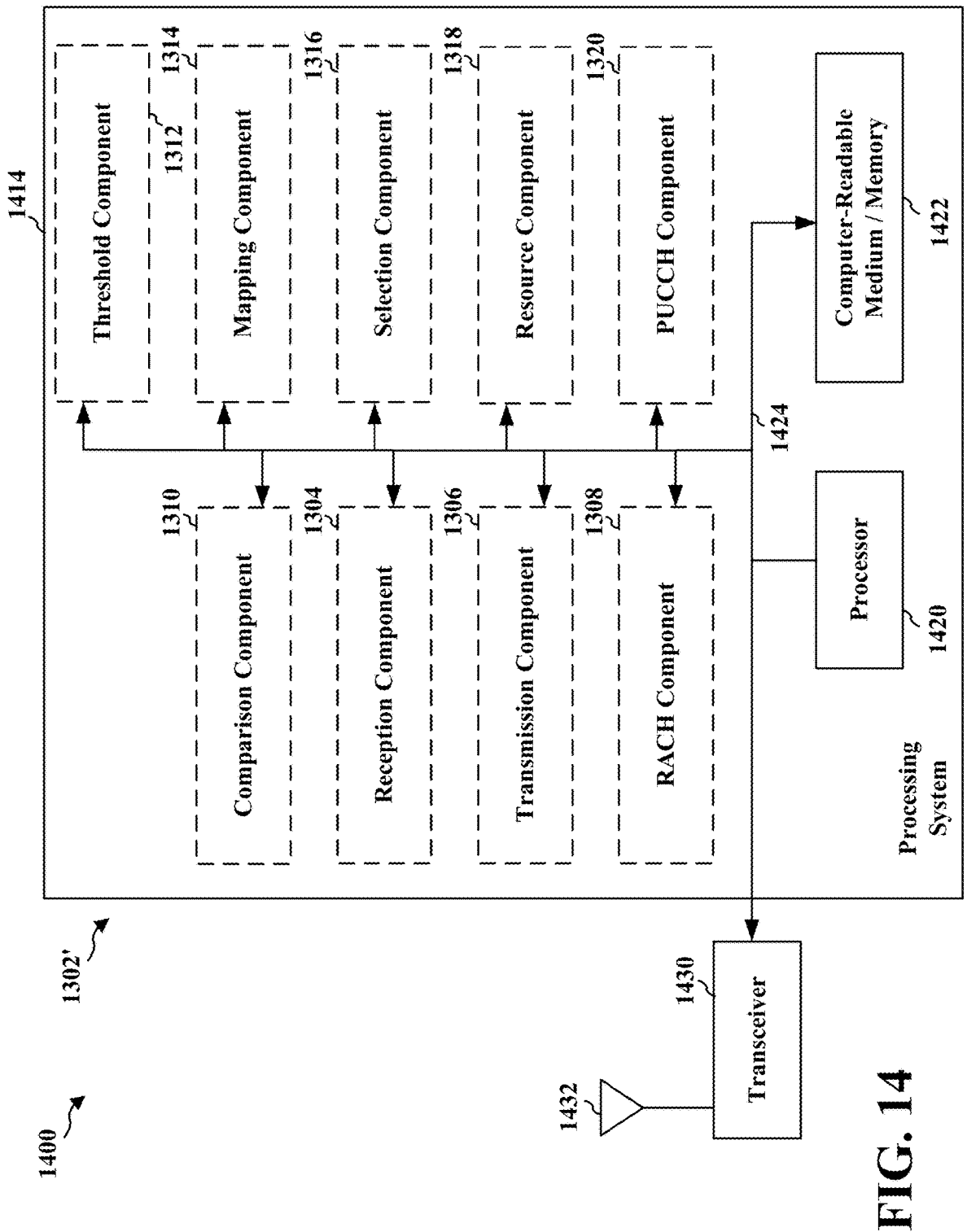
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1420, the components 1304, 1306, 1308, 1310, 1312, 1314, 1316, 1318, 1320, and the computer-readable medium/memory 1422. As such, all components linked by the bus 1424 are communicatively coupled with each other. The bus 1424 may also link various other circuits such as timing sources, peripherals, voltage regulators, and power management circuits, which are well known in the art, and therefore, will not be described any further.

The processing system 1414 may be coupled to a transceiver 1430. The transceiver 1430 is coupled to one or more antennas 1432. The transceiver 1430 provides a means for communicating with various other apparatus over a transmission medium. The transceiver 1430 receives a signal from the one or more antennas 1432, extracts information from the received signal, and provides the extracted information to the processing system 1414, specifically the reception component 1304. In addition, the transceiver 1430 receives information from the processing system 1414, specifically the transmission component 1306, and based on the received information, generates a signal to be applied to the one or more antennas 1432. The processing system 1414 includes a processor 1420 coupled to a computer-readable medium/memory 1422. The processor 1420 is responsible for general processing, including the execution of software stored on the computer-readable medium/memory 1422. The software, when executed by the processor 1420, causes the processing system 1414 to perform the various functions described supra for any particular apparatus. The computer-readable medium/memory 1422 may also be used for storing data that is manipulated by the processor 1420 when executing software. The processing system 1414 further includes at least one of the components 1304, 1306, 1308, 1310, 1312, 1314, 1316, 1318, 1320. The components may be software components running in the processor 1420, resident/stored in the computer readable medium/memory 1422, one or more hardware components coupled to the processor 1420, or some combination thereof The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for communicating, with a BS over a random access channel on a first set of random access resources or a second set of random access resources, a random access request based on a comparison between an intended transmit power of the random access request and a reference transmit power threshold. The apparatus 1302/1302' also includes means for communicating, with the BS over an uplink channel on a first set of uplink resources corresponding to the first set of random access resources, a control message for initial network access when the random access request is communicated on the first set of random access resources. The apparatus 1302/1302' also includes means for communicating, with the BS over the uplink channel on a second set of uplink resources corresponding to the second set of random access resources, the control message when the random access request is communicated on the second set of random access resources. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
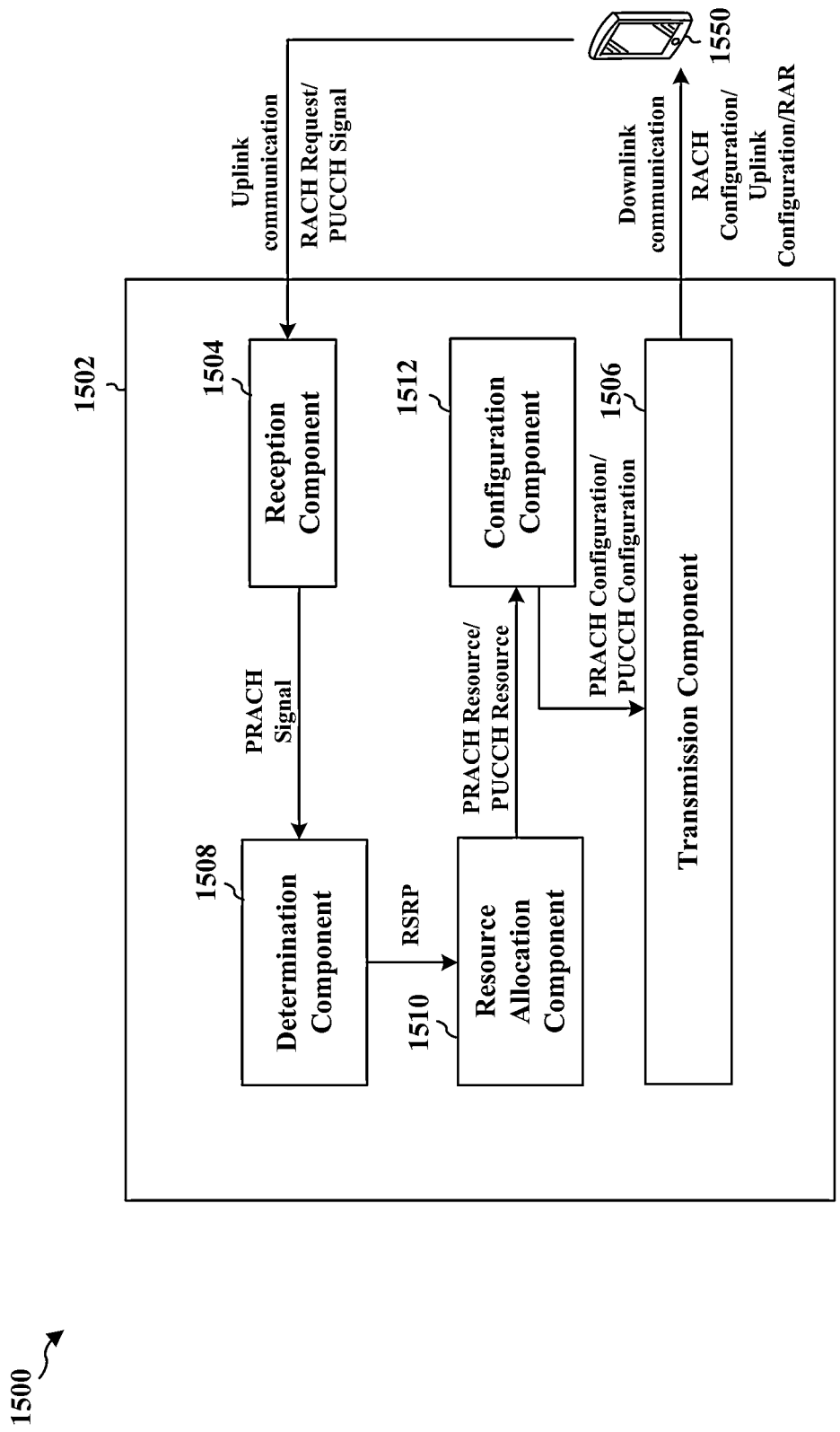
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a base station (e.g., BS 102, 180, 310, 1502, 1600) in wireless communication with UE 1550.

The apparatus includes a reception component 1504 that receives uplink communication from the UE 1550. The reception component 1504 may be configured to receive signals and/or other information from other devices including, e.g., UE 1550. The signals/information received by the reception component 1504 may be provided to one or more components of the apparatus 1502 for further processing and use in performing various operations in accordance with the methods discussed supra including the processes of the aforementioned flowchart 1200. Thus, via the reception component 1504, the apparatus 1502 and/or one or more components therein receive signals and/or other information (e.g., such as uplink data for the apparatus 1502 and/or other control signaling) from the UE 1550 as discussed supra and also discussed more specifically infra. In some aspects, the reception component 1504 is configured to receive, from a UE over a random access channel, a random access request, e.g., as described in connection with block 1206 of FIG. 12. In some aspects, the reception component 1504 may be configured to monitor for an uplink control message within a resource block of a first uplink resource allocation when the random access request is received on the one or more resources within the first random access resource allocation, e.g., as described in connection with block 1210 of FIG. 12. In some aspects, the reception component 1504 may be configured to monitor for the uplink control message across a plurality of contiguous resource blocks of a second uplink resource allocation when the random access request is received on the one or more resources within the second random access resource allocation, e.g., as described in connection with block 1212 of FIG. 12. In one or more implementations, the reception component 1504 may be implemented, for example, in the RX processor 356 with reference to FIG. 3.

The apparatus includes a determination component 1508 configured to determine whether the random access request is received on one or more resources within a first random access resource allocation or a second random access resource allocation, e.g., as described in connection with block 1208 of FIG. 12. Based on a RACH pre-configuration to the UE 1550, the apparatus can monitor for the random access request on certain frequency bands. In one or more implementations, the determination component 1508 may be implemented, for example, in any combination of the RX processor 356, the TX processor 368, and/or the controller/processor 359 with reference to FIG. 3.

The apparatus includes a resource allocation component 1510 configured to determine a first random access resource allocation and a second random access resource allocation. In some aspects, the first random access resource allocation may include first PRACH resources that correspond to a single-RB PUCCH resource. In some aspects, the second random access resource allocation may include second PRACH resources that correspond to a multi-RB PUCCH resource. In some implementations, the resource allocation component 1510 is also configured to determine a first uplink resource allocation that includes the single-RB PUCCH resource and a second uplink resource allocation that includes the multi-RB PUCCH resource. In other aspects, the resource allocation component 1510, in coordination with the determination component 1508, may measure the received random access request to determine whether the measured transmit power corresponds to the first random access resource allocation or the second random access resource allocation, as described in reference to FIG.

5. In one or more implementations, the resource allocation component 1510 may be implemented, for example, in any combination of the RX processor 356, the TX processor 368, and/or the controller/processor 359 with reference to FIG. 3.

The apparatus includes a configuration component 1512 configured to generate a first configuration indicating the first random access resource allocation and the second random access resource allocation. The configuration component 1512 is also configured to a second configuration indicating the first uplink resource allocation comprising one uplink resource block and the second uplink resource allocation comprising a plurality of contiguous resource blocks. In some aspects, the first random access resource allocation corresponds to the first uplink resource allocation and the second random access resource allocation corresponds to the second uplink resource allocation. In one or more implementations, the configuration component 1512 may be implemented, for example, in any combination of the RX processor 356, the TX processor 368, and/or the controller/processor 359 with reference to FIG. 3.

The apparatus includes a transmission component 1506 that transmits uplink communication to the UE 1550. The transmission component 1506 may be configured to transmit various messages to one or more external devices, e.g., including the UE 1550, in accordance with the methods disclosed herein. The messages/signals to be transmitted may be generated by one or more other components as discussed above, or the messages/signals to be transmitted may be generated by the transmission component 1506 under the direction/control of the one or more other components discussed supra. Thus, in various configurations, via the transmission component 1506, the apparatus 1502 and/or one or more components therein transmit signals and/or other information (e.g., such as downlink data, control messages and/or other signals) to external devices such as the UE 1550. In some aspects, the transmission component 1506 is configured to communicate, with the UE over a downlink channel, the first configuration indicating the first random access resource allocation and the second random access resource allocation, e.g., as described in connection with block 1202 of FIG. 12. In some aspects, the transmission component 1506, in coordination with the indication component 1512, is configured to communicate, with the UE over a downlink channel, the second configuration indicating the first uplink resource allocation and the second uplink resource allocation, e.g., as described in connection with block 1204 of FIG. 12. In one or more implementations, the transmission component 1506 may be implemented, for example, in the TX processor 368 with reference to FIG. 3.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
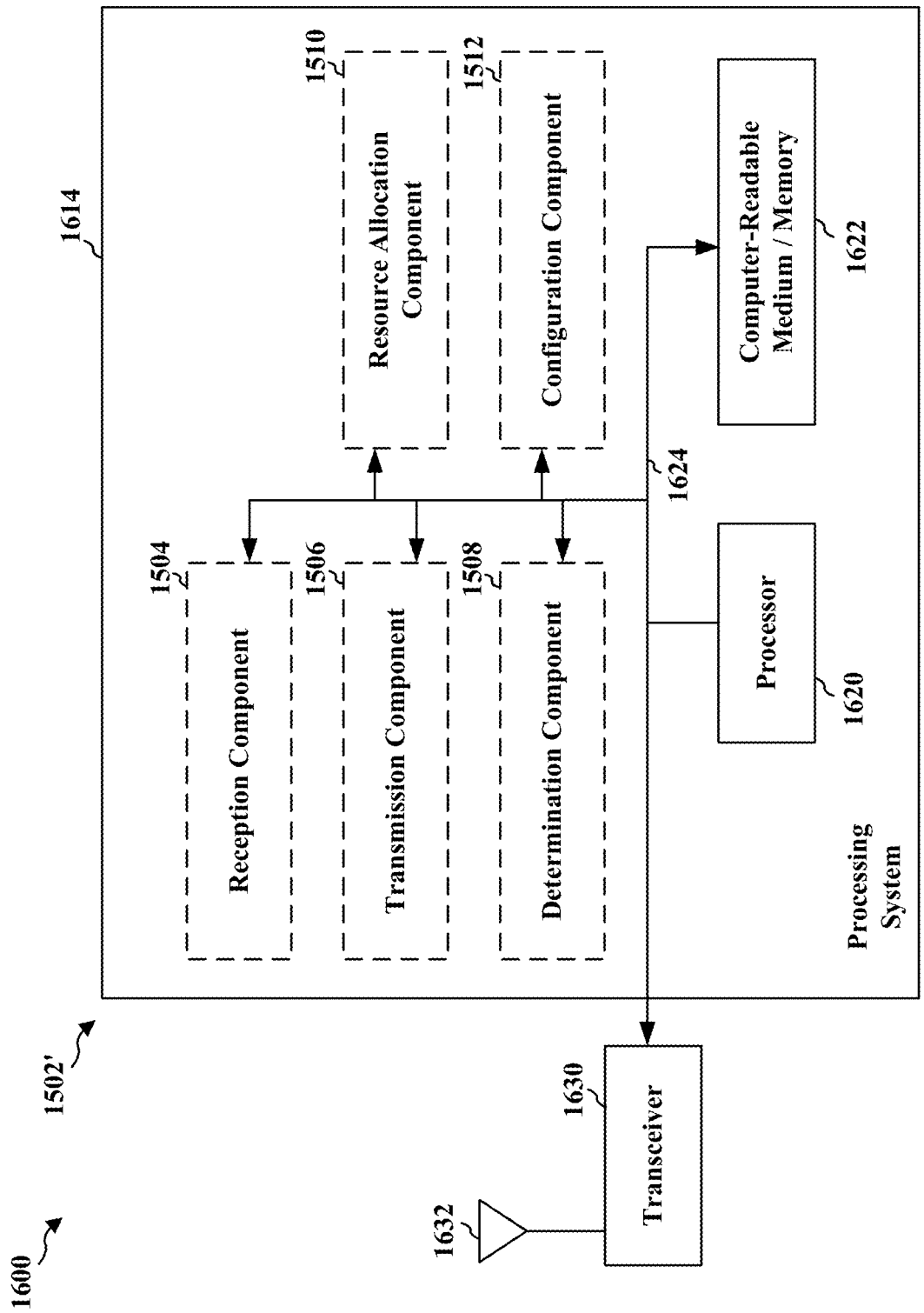
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1620, the components 1504, 1506, 1508, 1510, 1512, and the computer-readable medium/memory 1622. As such, all components linked by the bus 1424 are communicatively coupled with each other. The bus 1624 may also link various other circuits such as timing sources, peripherals, voltage regulators, and power management circuits, which are well known in the art, and therefore, will not be described any further.

The processing system 1614 may be coupled to a transceiver 1630. The transceiver 1630 is coupled to one or more antennas 1632. The transceiver 1630 provides a means for communicating with various other apparatus over a transmission medium. The transceiver 1630 receives a signal from the one or more antennas 1632, extracts information from the received signal, and provides the extracted information to the processing system 1614, specifically the reception component 1504. In addition, the transceiver 1630 receives information from the processing system 1614, specifically the transmission component 1506, and based on the received information, generates a signal to be applied to the one or more antennas 1632. The processing system 1614 includes a processor 1620 coupled to a computer-readable medium/memory 1622. The processor 1620 is responsible for general processing, including the execution of software stored on the computer-readable medium/memory 1622. The software, when executed by the processor 1620, causes the processing system 1614 to perform the various functions described supra for any particular apparatus. The computer-readable medium/memory 1622 may also be used for storing data that is manipulated by the processor 1620 when executing software. The processing system 1614 further includes at least one of the components 1504, 1506, 1508, 1510, 1512. The components may be software components running in the processor 1620, resident/stored in the computer readable medium/memory 1622, one or more hardware components coupled to the processor 1620, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for receiving, from a UE over a random access channel, a random access request. The apparatus 1502/1502' also includes means for determining whether the random access request is received on one or more resources within a first random access resource allocation or a second random access resource allocation. The apparatus 1502/1502' also includes means for monitoring for an uplink control message within a resource block of a first uplink resource allocation when the random access request is received on the one or more resources within the first random access resource allocation. The apparatus 1502/1502' also includes means for monitoring for the uplink control message across a plurality of contiguous resource blocks of a second uplink resource allocation when the random access request is received on the one or more resources within the second random access resource allocation. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following clauses are illustrative only and may be combined with aspects of other implementations or teachings described herein, without limitation.

Aspect 1 is a method of wireless communication at a user equipment that includes communicating, with a base station (BS) over a random access channel on a first set of random access resources or a second set of random access resources, a random access request based on a comparison between an intended transmit power of the random access request and a reference transmit power threshold; communicating, with the BS over an uplink channel on a first set of uplink resources corresponding to the first set of random access resources, a control message for initial network access when the random access request is communicated on the first set of random access resources; and communicating, with the BS over the uplink channel on a second set of uplink resources corresponding to the second set of random access resources, the control message when the random access request is communicated on the second set of random access resources.

In Aspect 2, the method of Aspect 1 further includes determining whether the intended transmit power of the random access request exceeds the reference transmit power threshold based on the comparison; selecting the first set of random access resources when the intended transmit power does not exceed the reference transmit power threshold; and selecting the second set of random access resources when the intended transmit power exceeds the reference transmit power threshold.

In Aspect 3, the method of Aspect 1 or Aspect 2 further includes that the communicating the random access request comprises transmitting, to the BS over the random access channel on the first set of random access resources, the random access request based on the comparison indicating that the intended transmit power is lesser than the reference transmit power threshold.

In Aspect 4, the method of any of Aspects 1-3 further includes that the communicating the random access request comprises transmitting, to the BS over the random access channel on the second set of random access resources, the random access request based on the comparison indicating that the intended transmit power is greater than the reference transmit power threshold.

In Aspect 5, the method of any of Aspects 1-4 further includes that the first set of uplink resources comprises a first number of uplink resources and the second set of uplink resources comprises a second number of uplink resources greater than the first number of uplink resources.

In Aspect 6, the method of any of Aspects 1-5 further includes that the first number of uplink resources corresponds to a single resource block allocated for a physical uplink control channel, and the communicating, on the first set of uplink resources, the control message comprises transmitting, to the BS over the uplink channel within the single resource block, the control message.

In Aspect 7, the method of any of Aspects 1-6 further includes that the second set of uplink resources corresponds to a plurality of contiguous resource blocks allocated for a physical uplink control channel, and the communicating, on the second set of uplink resources, the control message comprises transmitting, to the BS over the uplink channel, the control message spanning across the plurality of contiguous resource blocks.

In Aspect 8, the method of any of Aspects 1-7 further includes receiving, from the BS over a downlink channel, a radio resource control (RRC) message comprising a first configuration that indicates the first set of uplink resources and the second set of uplink resources, wherein: the first configuration indicates a data structure comprising a plurality of aggregation levels, and each of the plurality of aggregation levels corresponds to a different number of resource blocks allocated for a physical uplink control channel.

In Aspect 9, the method of any of Aspects 1-8 further includes receiving, from the BS over a downlink channel, an indication of which aggregation level of the plurality of aggregation levels is allocated to the UE; and selecting one of the plurality of aggregation levels based on the indication.

In Aspect 10, the method of any of Aspects 1-9 further includes that the first configuration indicates a mapping between an aggregation level and a corresponding resource block size for each of the plurality of aggregation levels, and the communicating the control message comprises transmitting the control message at a starting resource block index that spans the corresponding resource block size based on the mapping.

In Aspect 11, the method of any of Aspects 1-10 further includes selecting a cyclic shift step size from a plurality of cyclic shift step sizes; and shifting a baseband sequence based at least on the cyclic shift step size, wherein the control message comprises the shifted baseband sequence.

In Aspect 12, the method of any of Aspects 1-11 further includes that the cyclic shift step size is a fixed value across different resource block sizes that correspond to respective ones of the plurality of aggregation levels.

In Aspect 13, the method of any of Aspects 1-11 further includes that the cyclic shift step size is based on a resource block size that corresponds to the selected aggregation level.

In Aspect 14, the method of any of Aspects 1-13 further includes that the control message is communicated on a subband comprising a plurality of physical uplink control channels (PUCCHs), wherein the communicating the control message comprises transmitting the control message in a first PUCCH of the plurality of PUCCHs, and wherein the first PUCCH has a first format corresponding to PUCCH format 0 or a second format corresponding to PUCCH format 1.

In Aspect 15, the method of any of Aspects 1-14 further includes receiving, from the BS over a downlink channel, a radio resource control (RRC) message comprising a second configuration indicating the first set of random access resources and the second set of random access resources.

In Aspect 16, the method of any of Aspects 1-15 further includes that the second configuration comprises one or more parameters of the reference transmit power threshold, the one or more parameters indicate a distance between the UE and the BS and a mapping between the distance and the reference transmit power threshold, and further comprising determining the reference transmit power threshold based on the mapping.

In Aspect 17, the method of any of Aspects 1-16 further includes that the communicating the random access request comprises: transmitting the random access request with a first selected preamble format when the random access request is transmitted on the first set of random access resources; and transmitting the random access request with a second selected preamble format when the random access request is transmitted on the second set of random access resources, wherein the first selected preamble format has a first length and the second selected preamble format has a second length greater than the first length.

In Aspect 18, the method of any of Aspects 1-17 further includes that the communicating the random access request comprises: transmitting the random access request comprising a first preamble sequence when the random access request is transmitted on the first set of random access resources; and transmitting the random access request comprising a second preamble sequence when the random access request is transmitted on the second set of random access resources, wherein the first preamble sequence and the second preamble sequence are transmitted in a same random access channel occasion.

In Aspect 19, the method of any of Aspects 1-18 further includes that the communicating the random access request comprises: transmitting the random access request comprising a first preamble sequence when the random access request is transmitted on the first set of random access resources; and transmitting the random access request comprising a second preamble sequence when the random access request is transmitted on the second set of random access resources, wherein the first preamble sequence and the second preamble sequence are transmitted in different random access channel occasions.

Aspect 20 is a device including one or more processors and one or more memories in electronic communication with the one or more processors storing instructions executable by the one or more processors to cause the system or apparatus to implement a method as in any of Aspects 1 to 19.

Aspect 21 is a system or apparatus including means for implementing a method or realizing an apparatus as in any of Aspects 1 to 19.

Aspect 22 is a non-transitory computer readable medium storing instructions executable by one or more processors to cause the one or more processors to implement a method as in any of Aspects 1 to 19.

Aspect 23 is a method of wireless communication at a base station that includes receiving, from a user equipment (UE) over a random access channel, a random access request; determining whether the random access request is received on one or more resources within a first random access resource allocation or a second random access resource allocation; monitoring for an uplink control message within a resource block of a first uplink resource allocation when the random access request is received on the one or more resources within the first random access resource allocation; and monitoring for the uplink control message across a plurality of contiguous resource blocks of a second uplink resource allocation when the random access request is received on the one or more resources within the second random access resource allocation.

In Aspect 24, the method of Aspect 23 further includes communicating, with the UE over a downlink channel, a first configuration indicating the first random access resource allocation and the second random access resource allocation; and communicating, with the UE over a downlink channel, a second configuration indicating the first uplink resource allocation comprising one uplink resource block and the second uplink resource allocation comprising a plurality of contiguous resource blocks, wherein the first random access resource allocation corresponds to the first uplink resource allocation and the second random access resource allocation corresponds to the second uplink resource allocation.

Aspect 25 is a device including one or more processors and one or more memories in electronic communication with the one or more processors storing instructions executable by the one or more processors to cause the system or apparatus to implement a method as in any of Aspects 23 to 24.

Aspect 26 is a system or apparatus including means for implementing a method or realizing an apparatus as in any of Aspects 23 to 24.

Aspect 27 is a non-transitory computer readable medium storing instructions executable by one or more processors to cause the one or more processors to implement a method as in any of Aspects 23 to 24.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more.". Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration.". Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means.". As such, no claim element is to be construed as a means plus function unless the element is expressly recited using the phrase "means for.".

What is claimed is:

1. A method of wireless communication at a user equipment (UE), the method comprising:
communicating, with a base station (BS) over a random access channel on a first set of random access resources or a second set of random access resources, a random access request based on a comparison between an intended transmit power of the random access request and a reference transmit power threshold;
communicating, with the BS over an uplink channel on a first set of uplink resources corresponding to the first set of random access resources, a control message for initial network access based on the random access request being communicated on the first set of random access resources; and
communicating, with the BS over the uplink channel on a second set of uplink resources corresponding to the second set of random access resources, the control message based on the random access request being communicated on the second set of random access resources.

2. The method of claim 1, further comprising:
determining whether the intended transmit power of the random access request exceeds the reference transmit power threshold based on the comparison;
selecting the first set of random access resources when the intended transmit power does not exceed the reference transmit power threshold; and
selecting the second set of random access resources when the intended transmit power exceeds the reference transmit power threshold.

3. The method of claim 1, wherein the communicating the random access request comprises transmitting, to the BS over the random access channel on the first set of random access resources, the random access request based on the comparison indicating that the intended transmit power is lesser than the reference transmit power threshold.

4. The method of claim 1, wherein the communicating the random access request comprises transmitting, to the BS over the random access channel on the second set of random access resources, the random access request based on the comparison indicating that the intended transmit power is greater than the reference transmit power threshold.

5. The method of claim 1, wherein the first set of uplink resources comprises a first number of uplink resources and the second set of uplink resources comprises a second number of uplink resources greater than the first number of uplink resources.

6. The method of claim 5, wherein:
the first number of uplink resources corresponds to a single resource block allocated for a physical uplink control channel, and
the communicating, on the first set of uplink resources, the control message comprises transmitting, to the BS over the uplink channel within the single resource block, the control message.

7. The method of claim 6, wherein:
the second set of uplink resources corresponds to a plurality of contiguous resource blocks allocated for a physical uplink control channel, and
the communicating, on the second set of uplink resources, the control message comprises transmitting, to the BS over the uplink channel, the control message spanning across the plurality of contiguous resource blocks.

8. The method of claim 1, further comprising:
receiving, from the BS over a downlink channel, a radio resource control (RRC) message comprising a first configuration that indicates the first set of uplink resources and the second set of uplink resources,
wherein:
the first configuration indicates a data structure comprising a plurality of aggregation levels, and
each of the plurality of aggregation levels corresponds to a different number of resource blocks allocated for a physical uplink control channel.

9. The method of claim 8, further comprising:
receiving, from the BS over a downlink channel, an indication of which aggregation level of the plurality of aggregation levels is allocated to the UE; and
selecting one of the plurality of aggregation levels based on the indication.

10. The method of claim 9, wherein:
the first configuration indicates a mapping between an aggregation level and a corresponding resource block size for each of the plurality of aggregation levels, and
the communicating the control message comprises transmitting the control message at a starting resource block index that spans the corresponding resource block size based on the mapping.

11. The method of claim 9, further comprising:
selecting a cyclic shift step size from a plurality of cyclic shift step sizes; and
shifting a baseband sequence based at least on the cyclic shift step size,
wherein the control message comprises the shifted baseband sequence.

12. The method of claim 11, wherein the cyclic shift step size is a fixed value across different resource block sizes that correspond to respective ones of the plurality of aggregation levels.

13. The method of claim 11, wherein the cyclic shift step size is based on a resource block size that corresponds to the selected aggregation level.

14. The method of claim 1, wherein the control message is communicated on a subband comprising a plurality of physical uplink control channels (PUCCHs), wherein the communicating the control message comprises transmitting the control message in a first PUCCH of the plurality of PUCCHs, and wherein the first PUCCH has a first format corresponding to PUCCH format 0 or a second format corresponding to PUCCH format 1.

15. The method of claim 1, further comprising:
receiving, from the BS over a downlink channel, a radio resource control (RRC) message comprising a second configuration indicating the first set of random access resources and the second set of random access resources.

16. The method of claim 15, wherein:
the second configuration comprises one or more parameters of the reference transmit power threshold,
the one or more parameters indicate a distance between the UE and the BS and a mapping between the distance and the reference transmit power threshold, and
further comprising determining the reference transmit power threshold based on the mapping.

17. The method of claim 1, wherein the communicating the random access request comprises:
transmitting the random access request with a first selected preamble format when the random access request is transmitted on the first set of random access resources; and transmitting the random access request with a second selected preamble format when the random access request is transmitted on the second set of random access resources,
wherein the first selected preamble format has a first length and the second selected preamble format has a second length greater than the first length.

18. The method of claim 1, wherein the communicating the random access request comprises:
transmitting the random access request comprising a first preamble sequence when the random access request is transmitted on the first set of random access resources; and
transmitting the random access request comprising a second preamble sequence when the random access request is transmitted on the second set of random access resources,
wherein the first preamble sequence and the second preamble sequence are transmitted in a same random access channel occasion.

19. The method of claim 1, wherein the communicating the random access request comprises:
transmitting the random access request comprising a first preamble sequence when the random access request is transmitted on the first set of random access resources; and
transmitting the random access request comprising a second preamble sequence when the random access request is transmitted on the second set of random access resources,
wherein the first preamble sequence and the second preamble sequence are transmitted in different random access channel occasions.

20. An apparatus for wireless communication at a user equipment (UE), the apparatus comprising:
at least one processor; and
a memory communicatively coupled with the at least one processor and storing processor-readable code that, when executed by the at least one processor, causes the apparatus to:
determine whether a transmission power of a random access request exceeds a reference threshold;
select a first random access resource allocation when the transmission power does not exceed the reference threshold;
select a second random access resource allocation when the transmission power exceeds the reference threshold;
transmit the random access request in the first random access resource allocation or the second random access resource allocation;
transmit an uplink control message using a first uplink resource allocation based on the first random access resource allocation being selected; and
transmit the uplink control message using a second uplink resource allocation based on the second random access resource allocation being selected.

21. The apparatus of claim 20, wherein the code further causes the apparatus to:
receive a downlink configuration indicating the first random access resource allocation and the second random access resource allocation, the first random access resource allocation corresponding to the first uplink resource allocation and the second random access resource allocation corresponding to the second uplink resource allocation.

22. The apparatus of claim 21, wherein:
the downlink configuration indicates a data structure comprising a plurality of aggregation levels,
each of the plurality of aggregation levels corresponds to a different number of resource blocks allocated for a physical uplink control channel, and
the code further causes the apparatus to:
receive an indication of which aggregation level of the plurality of aggregation levels is allocated to the UE; and
select one of the plurality of aggregation levels based on the indication.

23. The apparatus of claim 22, wherein:
the downlink configuration indicates a mapping between an aggregation level and a corresponding resource block size for each of the plurality of aggregation levels, and
the code further causes the apparatus to transmit the uplink control message at a starting resource block index that spans the corresponding resource block size based on the mapping.

24. The apparatus of claim 22, the code further causes the apparatus to:
select a cyclic shift step size from a plurality of cyclic shift step sizes; and
shift a baseband sequence based at least on the cyclic shift step size,
wherein the uplink control message comprises the shifted baseband sequence.

25. The apparatus of claim 24, wherein the cyclic shift step size is a fixed value across different resource block sizes that correspond to respective ones of the plurality of aggregation levels.

26. The apparatus of claim 24, wherein the cyclic shift step size is based on a resource block size that corresponds to the selected aggregation level.

27. A method of wireless communication at a base station (BS), the method comprising:
receiving, from a user equipment (UE) over a random access channel, a random access request;
determining whether the random access request is received on one or more resources within a first random access resource allocation or a second random access resource allocation;
monitoring for an uplink control message within a resource block of a first uplink resource allocation when the random access request is received on the one or more resources within the first random access resource allocation; and
monitoring for the uplink control message across a plurality of contiguous resource blocks of a second uplink resource allocation when the random access request is received on the one or more resources within the second random access resource allocation.

28. The method of claim 27, further comprising:
communicating, with the UE over a downlink channel, a first configuration indicating the first random access resource allocation and the second random access resource allocation; and
communicating, with the UE over a downlink channel, a second configuration indicating the first uplink resource allocation comprising one uplink resource block and the second uplink resource allocation comprising a plurality of contiguous resource blocks,
wherein the first random access resource allocation corresponds to the first uplink resource allocation and the second random access resource allocation corresponds to the second uplink resource allocation.

29. An apparatus for wireless communication at a base station, the apparatus comprising:
- at least one processor; and
- a memory communicatively coupled with the at least one processor and storing processor-readable code that, when executed by the at least one processor, causes the apparatus to:
  - receive, from a user equipment (UE) over a random access channel, a random access request;
  - determine whether the random access request is received on one or more resources within a first random access resource allocation or a second random access resource allocation;
  - monitor for an uplink control message within a resource block of a first uplink resource allocation when the random access request is received on the one or more resources within the first random access resource allocation; and
  - monitor for the uplink control message across a plurality of contiguous resource blocks of a second uplink resource allocation when the random access request is received on the one or more resources within the second random access resource allocation.

30. The apparatus of claim 29, wherein the code further causes the apparatus to:
- communicate, with the UE over a downlink channel, a first configuration indicating the first random access resource allocation and the second random access resource allocation; and
- communicate, with the UE over a downlink channel, a second configuration indicating the first uplink resource allocation comprising one uplink resource block and the second uplink resource allocation comprising a plurality of contiguous resource blocks,
- wherein the first random access resource allocation corresponds to the first uplink resource allocation and the second random access resource allocation corresponds to the second uplink resource allocation.

* * * * *